United States Patent
Asanuma

(10) Patent No.: US 10,907,585 B2
(45) Date of Patent: Feb. 2, 2021

(54) EVAPORATED FUEL PROCESSING DEVICE

(71) Applicant: AISAN KOGYO KABUSHIKI KAISHA, Obu (JP)

(72) Inventor: Daisaku Asanuma, Gamagori (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 16/627,492

(22) PCT Filed: Jun. 8, 2018

(86) PCT No.: PCT/JP2018/022079
§ 371 (c)(1),
(2) Date: Dec. 30, 2019

(87) PCT Pub. No.: WO2019/009013
PCT Pub. Date: Jan. 10, 2019

(65) Prior Publication Data
US 2020/0166008 A1    May 28, 2020

(30) Foreign Application Priority Data
Jul. 5, 2017 (JP) .................................. 2017-132175

(51) Int. Cl.
*F02M 33/02* (2006.01)
*F02M 25/08* (2006.01)
(Continued)

(52) U.S. Cl.
CPC ..... *F02M 25/089* (2013.01); *B60K 15/03504* (2013.01); *B60K 15/03519* (2013.01);
(Continued)

(58) Field of Classification Search
CPC ........ F02M 25/08–0836; F02M 25/089; F02D 41/004
(Continued)

(56) References Cited

U.S. PATENT DOCUMENTS

| 6,477,889 B2 | 11/2002 | Yamaki |
| 7,159,580 B2 * | 1/2007 | Shikama ............ F02M 25/0827 |
| | | 123/518 |

(Continued)

FOREIGN PATENT DOCUMENTS

| JP | 2001-182629 A | 7/2001 |
| JP | 2005-147057 A | 6/2005 |

(Continued)

OTHER PUBLICATIONS

International Search Report (ISR) for PCT/JP2018/022079 dated Aug. 21, 2018 (4 pages total including translation).

(Continued)

*Primary Examiner* — John Kwon
(74) *Attorney, Agent, or Firm* — Shumaker, Loop & Kendrick, LLP

(57) ABSTRACT

An evaporated fuel processing device that determines whether a normal state is established, by using pressures by a pressure detector while the evaporated fuel processing device shifts between: a first state where a purge passage is opened by a first valve, air passage is opened by a second valve, the purge passage is closed by a third valve, and a pump stops; a second state, after the first state, where the purge passage is opened by the first valve, the air passage is opened by the second valve, the purge passage is closed by the third valve, and the pump is operating; and a third state which takes place after the second state and where the purge passage is opened by the first valve, the air passage is closed by the second valve, the purge passage is closed by the third valve, and the pump stops.

9 Claims, 14 Drawing Sheets

(51) Int. Cl.
  *B60K 15/035* (2006.01)
  *F02D 41/00* (2006.01)
(52) U.S. Cl.
  CPC ....... *F02D 41/003* (2013.01); *F02M 25/0809* (2013.01); *F02M 25/0836* (2013.01); *B60K 2015/03514* (2013.01)
(58) Field of Classification Search
  USPC .................................................. 123/518–521
  See application file for complete search history.

(56) References Cited

U.S. PATENT DOCUMENTS

| | | | |
|---|---|---|---|
| 7,216,637 B2 | 5/2007 | Uchida et al. | |
| 7,255,093 B2 | 8/2007 | Iihoshi et al. | |
| 9,476,793 B2* | 10/2016 | Takakura | G01M 3/2876 |
| 2006/0031000 A1* | 2/2006 | Amano | F02M 25/0818 |
| | | | 701/114 |
| 2007/0295313 A1* | 12/2007 | Amano | F02M 25/0836 |
| | | | 123/520 |
| 2013/0008414 A1* | 1/2013 | Matsunaga | F02M 25/0836 |
| | | | 123/519 |
| 2014/0174411 A1* | 6/2014 | Matsunaga | F02M 25/0809 |
| | | | 123/520 |
| 2014/0345576 A1* | 11/2014 | Furuhata | F02M 25/0809 |
| | | | 123/520 |
| 2015/0114361 A1* | 4/2015 | Matsunaga | F02M 25/089 |
| | | | 123/520 |
| 2019/0145354 A1* | 5/2019 | Kato | F02M 35/1038 |
| | | | 123/520 |
| 2019/0203666 A1* | 7/2019 | Asanuma | F02M 37/22 |
| 2020/0141359 A1* | 5/2020 | Nakagawa | F02M 25/0836 |

FOREIGN PATENT DOCUMENTS

| | | |
|---|---|---|
| JP | 2007-32523 A | 2/2007 |
| JP | 2013-185526 A | 9/2013 |
| WO | 20050001273 A | 1/2005 |

OTHER PUBLICATIONS

International Search Report (ISR) for PCT/JP2018/022079 dated Aug. 21, 2018 (10 pages including English translation).

* cited by examiner

EVAPORATED FUEL PROCESSING DEVICE

TECHNICAL FIELD

The description herein relates to an evaporated fuel processing device mounted on a vehicle.

BACKGROUND ART

Japanese Patent Application Publication 2007-32523 describes an evaporated fuel processing device that supplies evaporated fuel in a fuel tank to an intake passage of an engine through a purge passage. The evaporated fuel processing device is provided with a canister, an air passage communicating the canister and open air, a pump disposed on the air passage, and a switching valve disposed on the air passage between the pump and the canister.

The evaporated fuel processing device is further provided with an inspection passage for inspecting presence/absence of a leak in the evaporated fuel processing device. The inspection passage is disposed parallel to the air passage between the switching valve and the canister. When the evaporated fuel is to be supplied to the intake passage, the switching valve communicates the pump and the canister through the air passage. On the other hand, when the presence/absence of a leak is to be inspected, the switching valve communicates the pump and the canister through the inspection passage.

SUMMARY

Technical Problem

In addition to the air passage used for supplying the evaporated fuel to the intake passage, the above evaporated fuel processing device is provided with the inspection passage and the switching valve for switching passages for determining the presence/absence of a leak. With this configuration, the presence of a leak is determined when a leak is occurring in the inspection passage. That is, there may be a case in which a leak is determined as occurring, even if no leak is occurring in the passage for supplying the evaporated fuel to the intake passage.

The description herein provides an art configured to determine whether or not an evaporated fuel processing device is in a state in which evaporated fuel can be supplied normally to an intake passage without using a passage other than passages used for supplying the evaporated fuel to the intake passage.

Solution to Technical Problem

The art disclosed in the specification relates to an evaporated fuel processing device. The evaporated fuel processing device may comprise: a canister disposed on a purge passage communicating a fuel tank and an intake passage of an engine, and configured to store evaporated fuel generated in the fuel tank; a pump disposed on an air passage communicating the canister and open air, the air passage being different from the purge passage; a first switching valve disposed between the canister and the fuel tank, and configured to switch the purge passage between being opened and closed; a second switching valve disposed on the air passage, and configured to switch the air passage between being opened and closed; a pressure detector comprising at least one of a first pressure sensor disposed on a fuel tank side relative to the first switching valve and a second pressure sensor disposed on an intake passage side relative to the first switching valve, the second switching valve, and the pump; a third switching valve disposed on the purge passage on an intake passage side relative to the canister and the pressure detector, and configured to switch the purge passage between being open and closed; and a determining unit configured to determine whether or not the evaporated fuel processing device is in a normal state in which the evaporated fuel is normally supplied to the intake passage. The determining unit may be configured to determine whether or not the evaporated fuel processing device is in the normal state, by using pressures detected by the pressure detector while the evaporated fuel processing device shifts between a first state, a second state, and a third state. The first state may be a state in which the purge passage is opened by the first switching valve, the air passage is opened by the second switching valve, the purge passage is closed by the third switching valve, and the pump is stopped. The second state may be a state which takes place after the first state and in which the purge passage is opened by the first switching valve, the air passage is opened by the second switching valve, the purge passage is closed by the third switching valve, and the pump is operating. The third state may be a state which takes place after the second state and in which the purge passage is opened by the first switching valve, the air passage is closed by the second switching valve, the purge passage is closed by the third switching valve, and the pump is stopped.

In this configuration, the state in which the canister and the fuel tank are communicated and the state in which they are cut off can be switched by the first switching valve. Due to this, a space extending from the fuel tank to the third switching valve may be partitioned to determine the normal state of the evaporated fuel processing device. Further, the state of being communicated with the open air and the state of not being communicated therewith may be switched by the second switching valve. Further, by controlling the pump, a pressure between the fuel tank and the third switching valve may be changed. Due to this, a determination on being in a state in which the evaporated fuel is normally supplied to the intake passage or not, such as presence/absence of a leak, may be made by using the first switching valve, the second switching valve, and the pump in the state of not being communicated with the intake passage by the third switching valve. According to this configuration, the determination on being in the state in which the evaporated fuel is normally supplied to the intake passage by the evaporated fuel processing device or not may be made without using passages other than the passages used for supplying the evaporated fuel to the intake passage.

The pressure detector may comprise the first pressure sensor and the second pressure sensor, and the determining unit may be configured to determine whether or not the evaporated fuel processing device is in the normal state on a third switching valve side relative to the first switching valve, by using the pressure detected by the second pressure detector in a tank non-communicated state, which takes place before the first state and in which the purge passage is closed by the first switching valve and the third switching valve. According to this configuration, the fuel tank side relative to the first switching valve and the third switching valve side relative to the first switching valve are partitioned by the first switching valve, by which, even in a case where a leak is occurring on the fuel tank side relative to the first switching valve, the determination on the normal state of the evaporated fuel processing device may be made on the third switching valve side relative to the first switching valve without being affected by the leak.

The determining unit may be configured to determine whether or not the evaporated fuel processing device is in the normal state on the third switching valve side relative to the first switching valve, by using the pressure detected by the second pressure sensor in each of a fourth state, a fifth state and a sixth state, wherein the fourth state is a state in which the air passage is opened by the second switching valve and the pump is stopped, the fifth state is a state which takes place after the fourth state and in which the air passage is opened by the second switching valve and the pump is operating, and the sixth state is a state which takes place after the fifth state and in which the air passage is closed by the second switching valve and the pump is stopped. Since the third switching valve side relative to the first switching valve is communicated with the open air in the fourth state, the determination on the normal state of the evaporated fuel processing device can be made based on whether or not a pressure value by which the third switching valve side relative to the first switching valve approximates an atmospheric pressure is detected by the second pressure sensor. Further, in the fifth state, in a case where the pump is operating normally, a pressure on the third switching valve side relative to the first switching valve changes from the atmospheric pressure by the operation of the pump. On the other hand, in a case where the pump is not operating normally, a change in the pressure is not large. Due to this, the determination on the normal state of the evaporated fuel processing device including whether or not the pump operates normally can be made in the fifth state. Further, in the sixth state, the third switching valve side relative to the first switching valve is cut off from the open air in a state where the pressure is changing from the atmospheric pressure by the operation of the pump. If a leak is occurring on the third switching valve side relative to the first switching valve, the pressure thereby changes. Due to this, the determination on the normal state of the evaporated fuel processing device including the leak on the third switching valve side relative to the first switching valve may be made in the sixth state.

The determining unit may be configured to determine whether or not the evaporated fuel processing device is in the normal state on the fuel tank side relative to the first switching valve, by using the pressure detected by the first pressure detector in the tank non-communicated state. According to this configuration, the normal state on the fuel tank side relative to the first switching valve may be determined by using the first pressure sensor without being affected by the presence/absence of a leak on the third switching valve side relative to the first switching valve.

The pressure detector may comprise the first pressure sensor, and the determining unit may be configured to determine whether or not the evaporated fuel processing device is in the normal state by using the pressure detected by the first pressure detector in each of the first state, the second state, and the third state. In a situation where the purge passage is closed by the first switching valve, an evaporated fuel amount in the fuel tank changes by an ambient temperature of the fuel tank. If there is no leak on the fuel tank side relative to the first switching valve, a pressure on the fuel tank side relative to the first switching valve changes according to a change in the evaporated fuel amount in the fuel tank. In the normal state, the fuel tank side relative to the first switching valve communicates with the open air when the purge passage is opened by the first switching valve and the air passage is opened by the second switching valve in the first state, by which a pressure in the fuel tank changes. Due to this, in the first state, the determination on whether or not the evaporated fuel processing device is in the normal state may be made by using the first pressure sensor. Further, in a case of being in the normal state, a pressure value detected by the first pressure sensor due to the operation of the pump in the second state changes. Due to this, in the second state, the determination on whether or not the evaporated fuel processing device is in the normal state may be made by using the first pressure sensor. In the third state under the normal state, the passage between the fuel tank and the third switching valve is cut off from the open air in the state where the pressure is changing from the atmospheric pressure by the operation of the pump. On the other hand, if a leak is occurring between the fuel tank and the third switching valve, the pressure thereby changes. Due to this, the determination on the normal state of the evaporated fuel processing device including the leak between the fuel tank and the third switching valve can be made in the third state.

The pressure detector may comprise the first pressure sensor, and the determining unit may be configured to determine whether or not the evaporated fuel processing device is in the normal state on the fuel tank side relative to the first switching valve, by using the pressure detected by the first pressure detector in a tank non-communicated state which takes place before the first state and in which the purge passage is closed by the first switching valve and the third switching valve. In the situation where the purge passage is closed by the first switching valve, the evaporated fuel amount in the fuel tank changes by the ambient temperature of the fuel tank so long as there is no leak on the fuel tank side relative to the first switching valve. According to this configuration, the determination on the normal state of the evaporated fuel processing device including the presence/absence of a leak on the fuel tank side relative to the first switching valve may be made.

The pressure detector may comprise the second pressure sensor, and the determining unit may be configured to determine whether or not the evaporated fuel processing device is in the normal state, by using the pressure detected by the second pressure detector in each of the first state, the second state, and the third state. In the normal state, when the purge passage is opened by the first switching valve and the air passage is opened by the second switching valve in the first state, both the fuel tank side relative to the first switching valve and the third switching valve side relative to the first switching valve communicate with the open air. Due to this, in the first state, the determination on whether or not the evaporated fuel processing device is in the normal state may be made by the second pressure sensor. Further, in the case of the normal state, the pressure value detected by the second pressure sensor changes by the operation of the pump in the second state. Due to this, in the second state, the determination on whether or not the evaporated fuel processing device is in the normal state can be made by the second pressure sensor. In the third state under the normal state, the passage between the fuel tank and the third switching valve is cut off from the open air in the state where the pressure is changing from the atmospheric pressure by the operation of the pump. On the other hand, if a leak is occurring between the fuel tank and the third switching valve, the pressure thereby changes. Due to this, the determination on the normal state of the evaporated fuel processing device including the leak between the fuel tank and the third switching valve may be made in the third state.

A determination device provided with the determining unit of the evaporated fuel processing device as above, a control method for realizing the determination device, a computer program therefor, and a computer-readable recording medium storing the computer program are also novel and useful.

DESCRIPTION OF EMBODIMENTS

First Embodiment

Figure 1:
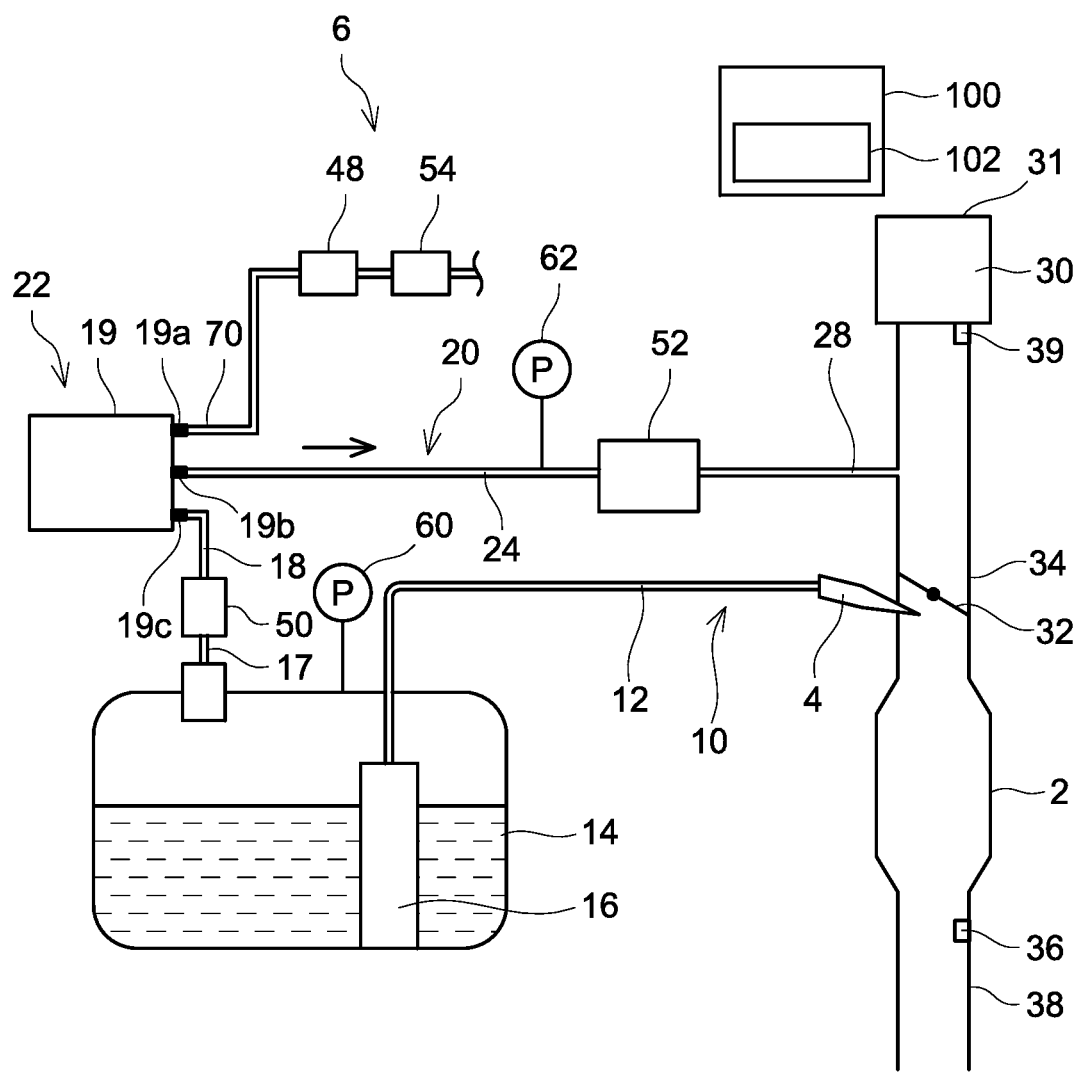
FIG. 1 shows an overview of a fuel supply system of a first embodiment.

A fuel supply system 6 comprising an evaporated fuel processing device 20 will be described with reference to FIG. 1. The fuel supply system 6 is mounted on a vehicle such as an automobile, and is provided with a main supply passage 10 for supplying fuel stored in a fuel tank 14 to an engine 2 and an evaporated fuel passage 22 for supplying evaporated fuel generated in the fuel tank 14 to the engine 2.

The main supply passage 10 is provided with a fuel pump unit 16, a supply passage 12, and an injector 4. The fuel pump unit 16 is provided with a fuel pump, a pressure regulator, a control circuit, and the like. The fuel pump unit 16 controls the fuel pump according to a signal supplied from an ECU 100. The fuel pump boosts pressure of the fuel in the fuel tank 14 and discharges the same. The pressure of the fuel discharged from the fuel pump is regulated by the pressure regulator, and the fuel is supplied from the fuel pump unit 16 to the supply passage 12. The supply passage 12 is connected to the fuel pump unit 16 and the injector 4. The fuel supplied to the supply passage 12 flows through the supply passage 12 and reaches the injector 4. The injector 4 includes a valve (not shown) of which aperture is controlled by the ECU 100. When the valve of the injector 4 is opened, the fuel in the supply passage 12 is supplied to an intake passage 34 connected to the engine 2.

The intake passage 34 is provided with an air cleaner 30. The air cleaner 30 is provided with a filter for removing foreign particles in air flowing into the intake passage 34. A suction inlet 31 is disposed at an upstream end of the air cleaner 30. A throttle valve 32 is provided within the intake passage 34 between the engine 2 and the air cleaner 30. When the throttle valve 32 opens, air is suctioned from the air cleaner 30 toward the engine 2. The ECU 100 adjusts an aperture of the throttle valve 32 to change an opening area of the intake passage 34 to adjust an air amount flowing into the engine 2. The throttle valve 32 is disposed on an air cleaner 30 side relative to the injector 4.

An air flow meter 39 is disposed on the intake passage 34 between the air cleaner 30 and the throttle valve 32. The air flow meter 39 may be one of a hot wire type, a Karman vortex type, and a movable plate type. The air flow meter 39 detects an air amount introduced to the intake passage 34 from the open air through the air cleaner 30.

Gas left after combustion in the engine 2 flows in an exhaust passage 38 and is discharged therefrom. An air-fuel ratio sensor 36 is disposed in the exhaust passage 38. The air-fuel ratio sensor 36 detects an air-fuel ratio in the exhaust passage 38. When acquiring the air-fuel ratio from the air-fuel ratio sensor 36, the ECU 100 estimates an air-fuel ratio of gas supplied to the engine 2.

The evaporated fuel passage 22 is disposed parallel to the main supply passage 10. The evaporated fuel passage 22 is a passage through which evaporated fuel generated in the fuel tank 14 flows when it moves from the fuel tank 14 to the intake passage 34 through a canister 19. As will be described later, the evaporated fuel is mixed with air in the canister 19. The mixed gas of the evaporated fuel and the air generated in the canister 19 is termed purge gas. The evaporated fuel processing device 20 is provided on the evaporated fuel passage 22. The evaporated fuel processing device 20 includes the canister 19, a pump 48, switching valves 50, 52, 54, pressure sensors 60, 62, and a control unit 102 of the ECU 100.

The fuel tank 14 and the canister 19 are connected via purge passages 17, 18 and the switching valve 50. The canister 19 is disposed at one end of a purge passage 24 and is connected to the switching valve 52 via the purge passage 24. The switching valve 52 is connected to the intake passage 34 via a purge passage 28. The purge passage 28 is connected to the intake passage 34 between the air flow meter 39 and the throttle valve 32.

The switching valve 50 is an electromagnetic valve of which switch between an opened state of being opened and a closed state of being closed is controlled by the control unit 102. In the closed state, the switching valve 50 cuts off the purge passages 17, 18 and thereby cuts off between the fuel tank 14 and the canister 19. On the other hand, in the opened state, the switching valve 50 communicates the purge passages 17, 18 and thereby communicates the fuel tank 14 and the canister 19.

The switching valve 52 is an electromagnetic valve of which switch between an opened state of being opened and a closed state of being closed is controlled by the control unit 102. In the closed state, the switching valve 52 cuts off the purge passages 24, 28 and thereby cuts off between the canister 19 and the intake passage 34. In the opened state, the switching valve 52 communicates the purge passages 24, 28 and thereby communicates the canister 19 and the intake passage 34. The control unit 102 executes a duty control of continuously switching the opened state and the closed state of the switching valve 52 according to a duty ratio determined by the air-fuel ratio and the like. The duty ratio indicates a ratio of a period of one opened state within a total period of one closed state and one opened state that take place successively while the switching valve 52 is continuously switched between the closed state and the opened state during the duty control. The switching valve 52 adjusts a flow rate of the purge gas supplied to the intake passage 34 by adjusting the duty ratio (that is, a length of the opened state).

The canister 19 is disposed between the switching valves 50 and 52. The canister 19 includes an open-air port 19a, a purge port 19b, and a tank port 19c. The open-air port 19a communicates with open air via an air passage 70. The open air may pass through an air filter (not shown), and may flow into the canister 19 from the open-air port 19a through the air passage 70. In such an occasion, foreign particles in the open air are prevented from entering the canister 19 by the air filter.

The purge port 19b is connected to the purge passage 24. The tank port 19c is connected to the fuel tank 14 via the purge passages 17, 18.

An activated charcoal (not shown) is housed in the canister 19. The activated charcoal adsorbs the evaporated fuel from the gas flowing into the canister 19 from the fuel tank 14 through the purge passages 17, 18 and the tank port 19c. The gas left after the evaporated fuel was adsorbed is discharged to the open air through the open-air port 19a and the air passage 70. The canister 19 can suppress the evaporated fuel in the fuel tank 14 from being discharged to the open air. The evaporated fuel adsorbed by the activated charcoal is supplied to the purge passage 24 from the purge port 19b.

The pump 48 and the switching valve 54 are disposed on the air passage 70. The switching valve 54 is an electromagnetic valve of which switch between an opened state of being opened and a closed state of being closed is controlled by the control unit 102. In the closed state, the switching valve 54 closes the air passage 70 and thereby cuts off the canister 19 from the open air. In the opened state, the switching valve 54 opens the air passage 70 and thereby communicates the canister 19 and the open air.

The pump 48 is disposed on the air passage 70 between the switching valve 54 and the canister 19. The pump 48 is a so-called vortex pump (which may also be called a cascade pump or a Wesco pump), or a centrifugal pump. The pump 48 is controlled by the control unit 102. When the switching valve 54 is in the opened state and the pump 48 is operated, air is pumped from the air passage 70 to the canister 19. Due to this, the purge gas in which the evaporated fuel in the canister 19 and the air are mixed is fed out to the purge passage 24. The purge gas fed out to the purge passage 24 flows through the purge passages 24, 28 and is supplied to the intake passage 34.

The pressure sensor 62 is disposed on the purge passage 24. The pressure sensor 62 detects a pressure in the purge passage 24 and outputs the same to the control unit 102. The pressure sensor 60 is disposed on the fuel tank 14. The pressure sensor 60 detects the pressure in the fuel tank 14.

The control unit 102 is connected to the pump 48, the switching valves 50, 52, 54, and the pressure sensors 60, 62. The control unit 102 includes a CPU and a memory such as a ROM and a RAM. The control unit 102 controls the pump 48 and the switching valves 50, 52, 54. Lines connecting the ECU 100 and the respective units are omitted. The control unit 102 stores a computer program for causing the control unit 102 to execute a normality determination process to be described later.

(Operation of Evaporated Fuel Processing Device)

Next, an operation of the evaporated fuel processing device 20 will be described. During when an ignition switch of the vehicle is on, the switching valves 50, 54 are maintained in the opened states. On the other hand, during when the ignition switch of the vehicle is off and the normality determination process to be described later is not executed, the switching valves 50, 52, 54 are maintained in the closed states.

When a purge condition is satisfied while the ignition switch is on and the engine 2 is running, the control unit 102 executes a purge process of supplying the purge gas to the engine 2 by performing duty control of the switching valve 52. When the purge process is executed, the purge gas is supplied in a direction shown by an arrow in FIG. 1 from left to right. The purge condition is a condition that is satisfied when the purge process of supplying the purge gas to the engine 2 should be executed, and is a condition set by a manufacturer in advance in the control unit 102 based on a cooling water temperature for the engine 2 and an evaporated fuel concentration in the purge gas (hereinbelow termed "purge concentration"). The control unit 102 monitors whether the purge condition is satisfied at all times while the engine 2 is running. The control unit 102 controls the duty ratio of the switching valve 52 based on the purge concentration and a measurement value of the air flow meter 39. Due to this, the purge gas that has been absorbed in the canister 19 is introduced to the engine 2. The purge concentration is specified by the control unit 102 using the air-fuel ratio. Alternatively, the purge concentration may be specified using concentration sensors disposed on the purge passages 24, 28 for example.

In a case of executing the purge process, the control unit 102 operates the pump 48 and supplies the purge gas to the intake passage 34. As a result, even in a case where a negative pressure in the intake passage 34 is small, the purge gas can be supplied. The pump 48 is operated during the purge process at a constant rotary speed (such as at 30,000 rpm).

Further, the ECU 100 controls the throttle valve 32. The ECU 100 further controls a fuel injection amount by the injector 4. Specifically, the fuel injection amount is controlled by controlling an opened time of the injector 4. When the engine 2 is driven, the ECU 100 calculates a fuel injection time per unit time during which injection is carried out from the injector 4 to the engine 2 (that is, the opened time of the injector 4). The fuel injection time corrects a reference injection time that is set in advance by experiments to maintain the air-fuel ratio at a target air-fuel ratio (such as an ideal air-fuel ratio). Further, the ECU 100 corrects the fuel injection amount based on the purge gas flow rate and the purge concentration.

(Normality Determination Process)

Next, the normality determination process which the control unit 102 executes will be described. In the normality determination process, a determination is made on whether or not a normal state in which the evaporated fuel processing device 20 supplies the purge gas normally to the intake passage 34, that is, the purge process can normally be executed, is established. For example, a crack could be generated in the evaporated fuel passage 22 or the fuel tank 14, by which a situation in which gas contained inside leaks outside may arise. Further, for example, a situation in which the pump 48 does not operate normally may arise. When such situations arise, the purge gas cannot be suitably supplied to the intake passage 34 in the purge process despite attempting to control the pump 48 and the switching valve 52 by the control unit 102.

Figure 2:
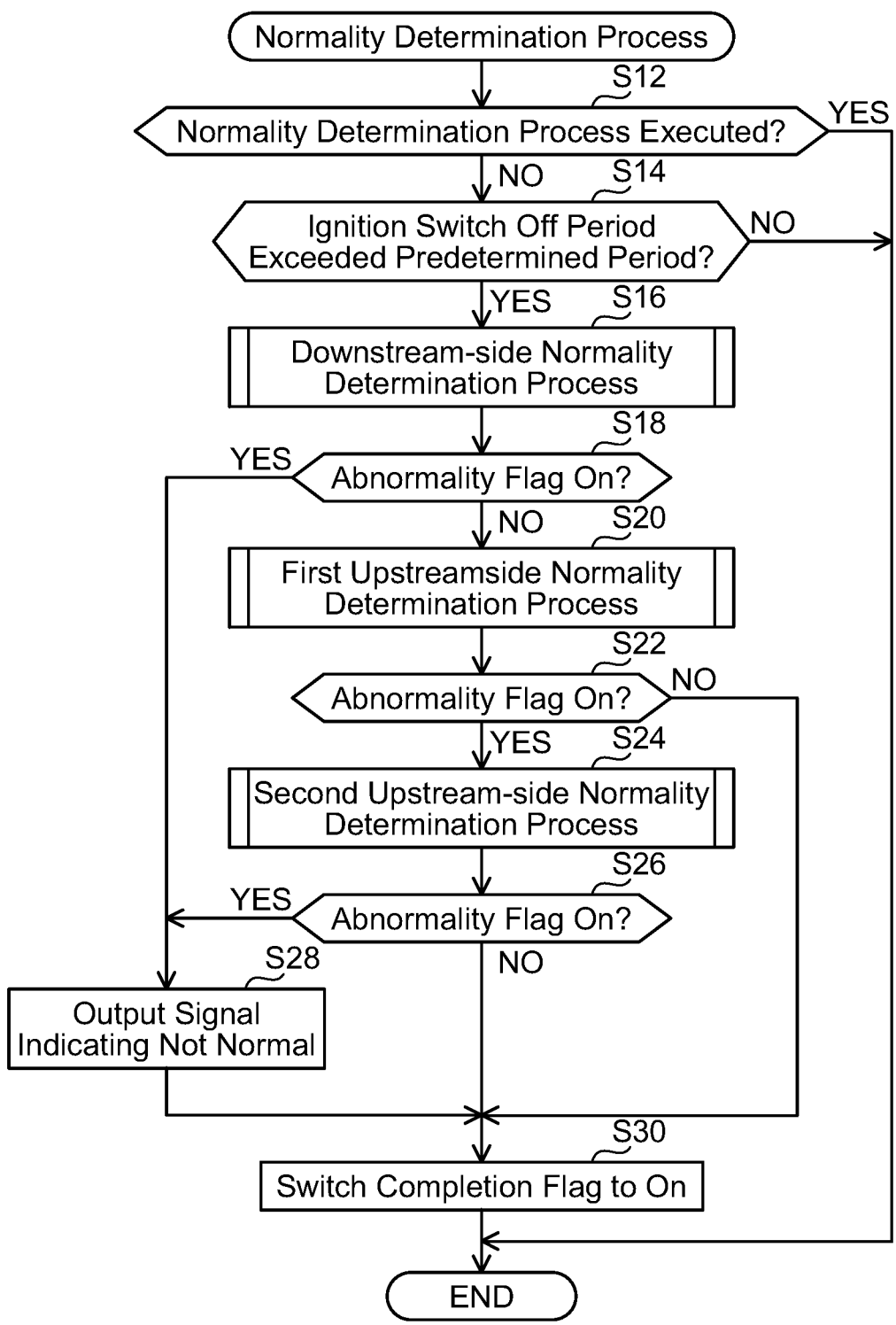
FIG. 2 shows a flowchart of a normality determination process of the first embodiment.

As shown in FIG. 2, the control unit 102 executes the normality determination process of determining whether or not the evaporated fuel processing device 20 is in the normal state. The control unit 102 periodically executes the normality determination process (such as every 10 ms). The control unit 102 executes the process regardless of the ignition switch of the vehicle being on or off.

In the normality determination process, firstly in S12, the control unit 102 determines whether or not the normality determination process has already been executed. The control unit 102 stores a completion flag. The process completion flag is set to on when the normality determination process is executed (see S30). Further, the process completion flag is set to off when the ignition switch is switched from off to on.

In a case where the completion flag is set to on, the control unit 102 determines that the normality determination process has been executed (YES to S12) and terminates the normality determination process. That is, once the normality determination process is terminated and the process completion flag is set to on, the process completion flag is maintained in an on-state until the ignition switch is switched from off to on. Due to this, once the normality determination process is terminated, the normality determination process does not proceed to S14 but ends thereat until the ignition switch is switched from off to on and the process completion flag is switched from on to off. On the other hand, in a case where the process completion flag is set to off, the control unit 102 determines that the normality determination process has not been executed (NO to S12) and proceeds to S14.

In S14, the control unit 102 determines whether or not a period during which the ignition switch is off has exceeded a predetermined period (such as an hour). The control unit 102 starts counting when the ignition switch is switched from on to off. In a case where a count value is a value corresponding to the predetermined period or greater, the control unit 102 determines that the period during which the ignition switch has been off has exceeded the predetermined period (YES to S14), and proceeds to S16. On the other hand, in a case where the count value is smaller than the value corresponding to the predetermined period, the control unit 102 determines that the period during which the ignition switch has been off has not exceeded the predetermined period (NO to S14), and terminates the normality determination process.

When the ignition switch is set to off, the switching valves 50, 52, 54 are closed and the pump 48 is stopped. Further, heat from the pump 48 and the engine 2 and vibration of the vehicle cease. As a result of this, pressures inside the fuel tank 14, the respective passages 17, 18, 24, 70, and the evaporated fuel processing device 20 stabilize. When the predetermined period elapses since when the ignition switch was set to off, the pressures in the fuel tank 14 and the evaporated fuel processing device 20 stabilize. Due to this, the determination on being in the normal state or not can more accurately be made by using the pressures in the fuel tank 14, the respective passages 17, 18, 24, 70, and the evaporated fuel processing device 20.

(Downstream-Side Normality Determination Process)

Figure 3:
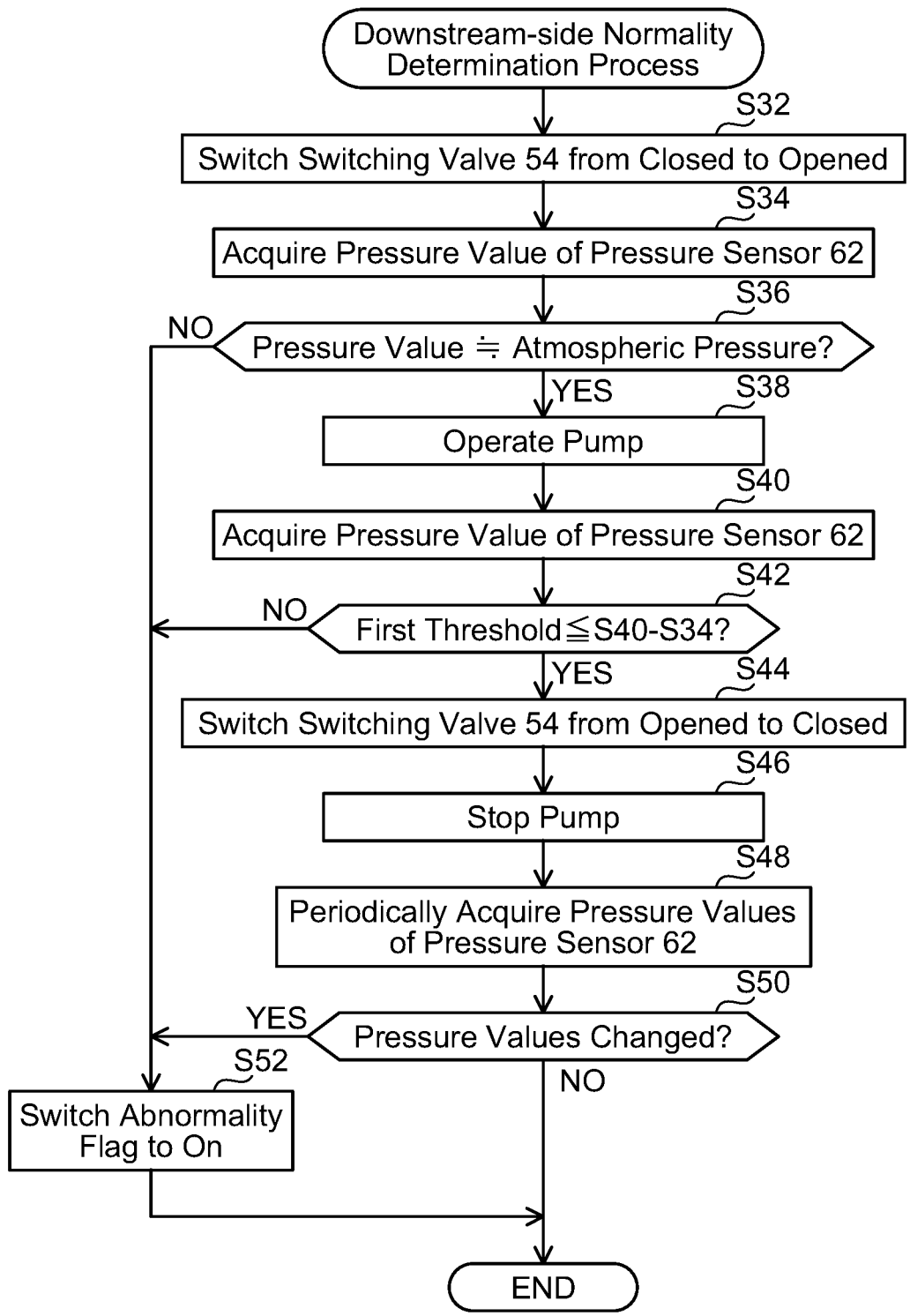
FIG. 3 shows a flowchart of a downstream-side normality determination process of the first embodiment.

In S16, the control unit 102 executes a downstream-side normality determination process. As shown in FIG. 3, in the downstream-side normality determination process, the control unit 102 switches the switching valve 54 from the closed state to the opened state in S32.

Then, in S34, the control unit 102 acquires a pressure value detected by the pressure sensor 62 (hereinbelow termed "pressure value of S34"). Then, in S36, the control unit 102 determines whether or not the pressure value of S34 approximates an atmospheric pressure. Specifically, the control unit 102 acquires the atmospheric pressure from a pressure sensor (not shown) disposed in the vehicle for detecting the atmospheric pressure. Then, a determination is made on whether or not a difference between the pressure value of S34 and the atmospheric pressure is within a predetermined range (such as ±0.5 kPa). The predetermined range is stored in advance in the control unit 102 by the manufacturer. In a case where the difference between the pressure value of S34 and the atmospheric pressure is within the predetermined range, a determination is made that the pressure value of S34 approximates the atmospheric pressure (YES to S36) and the process proceeds to S38. On the other hand, in a case where the difference between the pressure value of S34 and the atmospheric pressure is not within the predetermined range, the control unit 102 determines that the pressure value of S34 does not approximate the atmospheric pressure (NO to S36) and the process proceeds to S52.

In S38, the control unit 102 operates the pump 48 at a constant rotary speed (such as at 30,000 rpm). Then, in S40, the control unit 102 then acquires a pressure value detected by the pressure sensor 62 (hereinbelow termed "pressure value of S40").

Then, in S42, the control unit 102 determines whether or not a value which is obtained by subtracting the pressure value of S34, which is the pressure value substantially equal to the atmospheric pressure, from the pressure value of S40, is equal to or greater than a predetermined first threshold (such as 6 kPa). The first threshold is stored in advance in the control unit 102 by the manufacturer.

The process proceeds to S52 in a case where the value that subtracted the pressure value of S34 from the pressure value of S40 is determined as being less than the first threshold (NO to S42), and the process proceeds to S44 in a case where the value is determined as being equal to or greater than the first threshold (YES to S42). In S44, the control unit 102 switches the switching valve 54 from the opened state to the closed state. Then, in S46, the control unit 102 stops the pump 48. Due to this, a closed space in which the air passage 70, the purge passages 18, 24, and the canister 19 are cut off from outside by the switching valves 50, 52, 54 is thereby formed.

Next, in S48, the control unit 102 acquires pressure values detected by the pressure sensor 62 periodically (such as every 1 second) over a predetermined period (such as over 5 minutes). Then, in S50, the control unit 102 determines whether the pressure values detected in S48 over the predetermined period (hereinbelow termed "pressure values of S48") exhibit a change. Specifically, the control unit 102 determines, for each of the plurality of pressure values of S48 detected periodically, whether or not a difference between two time-wise consecutive pressure values of S48 is equal to or greater than a second threshold (such as 0.2 kPa). In a case one or more of the differences of the two consecutive pressure values of S48 are equal to or greater than the second threshold, the control unit 102 determines that the pressure is changing (YES to S50) and the process proceeds to S52. On the other hand, in a case where all the differences of the two consecutive pressure values of S48 are less than the second threshold, the control unit 102 determines that the pressure is not changing (NO to S50) and terminates the downstream-side determination process. The second threshold is stored in advance in the control unit 102 by the manufacturer.

In a variant, the control unit 102 may determine in S50 whether or not a total sum of the differences of the two consecutive pressure values of S48 calculated respectively for the plurality of pressure values of S48 is equal to or greater than a third threshold (such as 5 kPa) stored in advance in the control unit 102 by the manufacturer. Further, the control unit 102 may determine that the pressure is changing (YES to S50) in a case where the total sum of the differences of the pressure values is equal to or greater than the third threshold, and may determine that the pressure is not changing (NO to S50) in a case where the total sum of the differences of the pressure values is less than the third threshold.

In S52, the control unit 102 turns on an abnormality flag indicating not being in the normal state and terminates the downstream-side determination process. The abnormality flag is stored in the control unit 102, and is set to off before the downstream-side normality determination process is executed.

When the downstream-side determination process is terminated, the control unit 102 returns to the normality determination process of FIG. 2 and determines in S18 whether or not the abnormality flag is set to on in the downstream-side determination process. In a case of determining that the abnormality flag is set to on (YES to S18), the process proceeds to S28. On the other hand, in a case of determining that the abnormality flag is not set to on (NO to S18), the control unit 102 executes a first upstream-side normality determination process in S20.

(First Upstream-Side Normality Determination Process)

Figure 4:
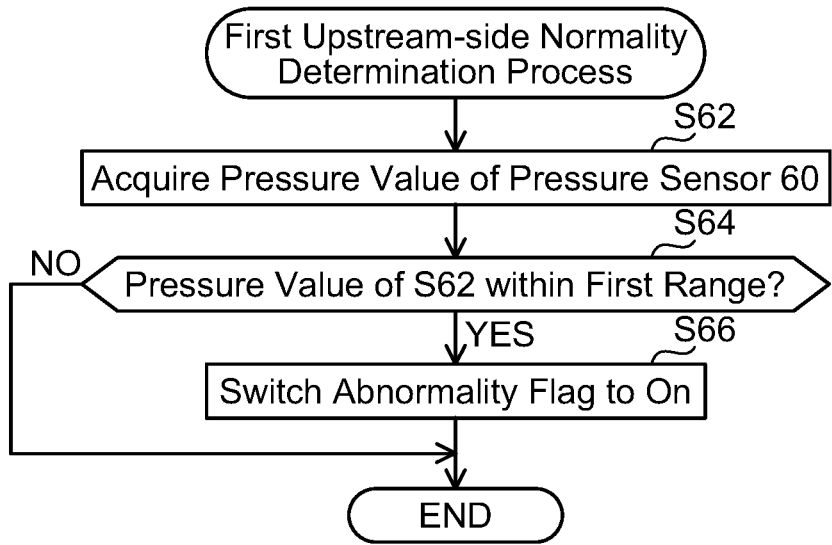
FIG. 4 shows a flowchart of a first upstream-side normality determination process of the first embodiment.

As shown in FIG. 4, in the first upstream-side normality determination process, firstly the control unit 102 acquires a pressure value detected by the pressure sensor 60 (hereinbelow termed "pressure value of S62") in S62. Then, in S64, a determination is made on whether or not the pressure value of S62 is within a first range. The first range is stored in advance in the control unit 102 by the manufacturer. In a case of determining that the pressure value of S62 is within the first range (YES to S64), the control unit 102 sets the abnormality flag to on in S66 and terminates the first upstream-side normality determination process. On the other hand, in a case of determining that pressure value of S62 is not within the first range (NO to S64), it skips S66 and terminates the first upstream-side normality determination process.

When the first upstream-side determination process is terminated, the control unit 102 returns to the normality determination process of FIG. 2 and determines whether or not the abnormality flag is set to on in S22. In a case of determining that the abnormality flag is not set to on (NO to S22), the process proceeds to S30. On the other hand, in a case of determining that the abnormality flag is set to on (YES to S22), the control unit 102 executes a second upstream-side normality determination process in S24. In a situation where the abnormality flag is set to on in the process of S22, it is not determined in the first upstream-side determination process as not being in the normal state, but rather, it is determined that there is a possibility of not being in the normal state. In this case, being in the normal state or not is determined in the second upstream-side determination process. On the other hand, in a situation where the abnormality flag is set to off in the process of S22, it is determined in the first upstream-side determination process as not being in the normal state.

(Second Upstream-Side Normality Determination Process)

Figure 5:
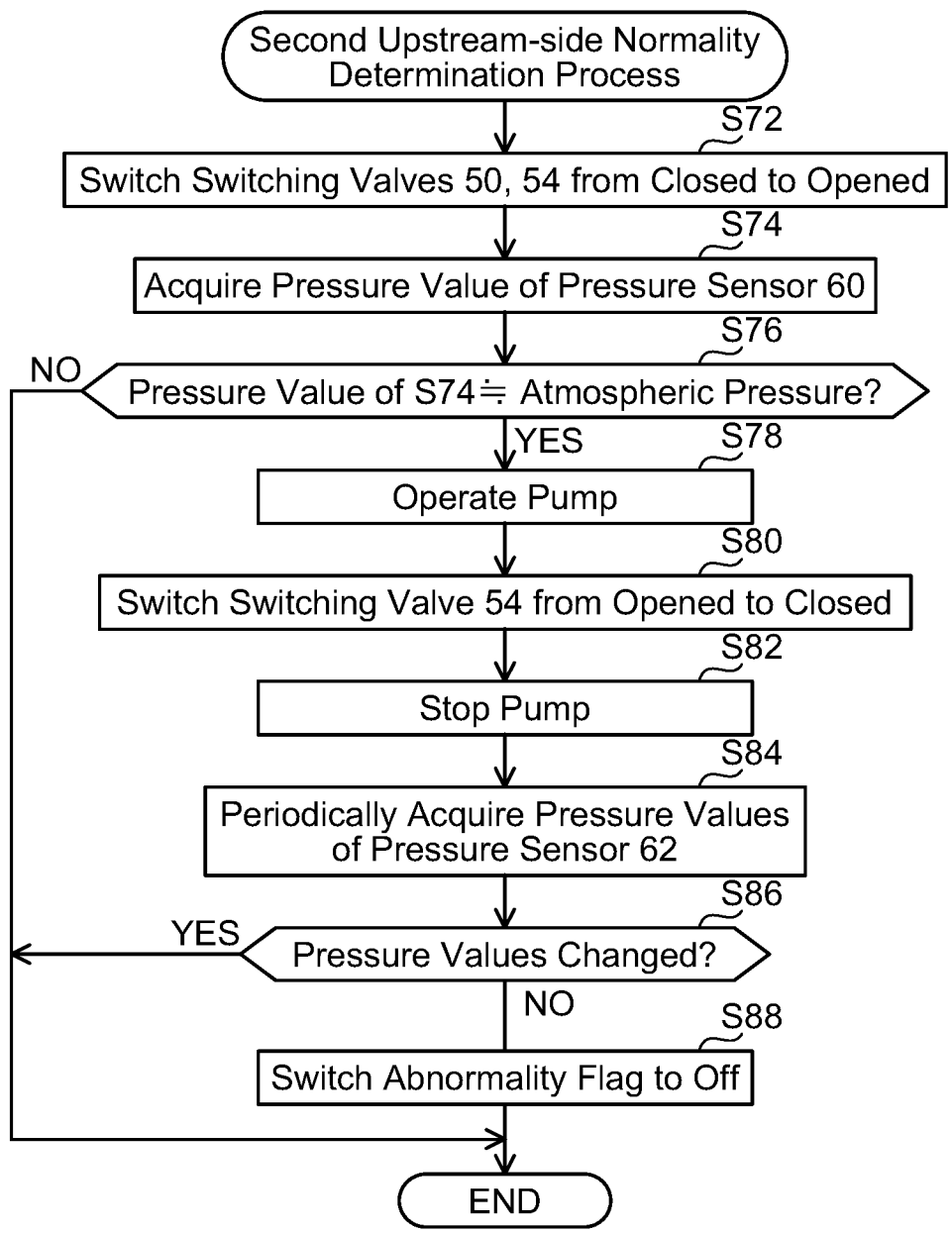
FIG. 5 shows a flowchart of a second upstream-side normality determination process of the first embodiment.

As shown in FIG. 5, in the second upstream-side determination process, firstly the control unit 102 switches the switching valves 50, 54 from the closed states to the opened states in S72. Then, in S74, the control unit 102 acquires a pressure value detected by the pressure sensor 60 (hereinbelow termed "pressure value of S74"). Then, in S76, the control unit 102 determines whether or not the pressure value of S74 is substantially equal to the atmospheric pressure, similar to S36.

In a case of determining that the pressure value of S74 does not approximate the atmospheric pressure (NO to S76), the second upstream-side normality determination process is terminated. Due to this, the second upstream-side normality determination process is terminated in the state where the abnormality flag is set to on. On the other hand, in a case of determining that the pressure value of S74 approximates the atmospheric pressure (YES to S76), the control unit 102 operates the pump 48 at a predetermined rotary speed (such as at 30,000 rpm) in S78. Then, in S80, the control unit 102 switches the switching valve 54 from the opened state to the closed state. Then, in S82, the control unit 102 stops the pump 48.

Next, in S84, the control unit 102 acquires pressure values detected by the pressure sensor 62 periodically over a predetermined period (hereinbelow termed "pressure values of S84"), similar to S48 of FIG. 3. Then, in S86, the control unit 102 determines whether or not the pressure values of S84 exhibit a change in the predetermined period, similar to S50. In a case of determining that the pressure values do not exhibit a change (NO to S86), the control unit 102 switches the abnormality flag from on to off in S88 and terminates the second upstream-side normality determination process. On the other hand, in a case of determining that the pressure values exhibit a change (YES to S86), it skips S88 and terminates the second upstream-side normality determination process. Due to this, the second upstream-side normality determination process is terminated in the state where the abnormality flag is set to on.

When the second upstream-side determination process is terminated, the control unit 102 returns to the normality determination process of FIG. 2 and determines whether or not the abnormality flag is set to on in S26. In a case of determining that the abnormality flag is not set to on (NO to S26), the process proceeds to S30. On the other hand, in a case of determining that the abnormality flag is set to on (YES to S26), the process proceeds to S28. In S28, the control unit 102 sends a signal indicating not being in the normal state to a display device (not shown) of the vehicle and then the process proceeds to S30. When the display device receives the signal from the control unit 102, it outputs a display indicating not being in the normal state. Due to this, a driver can acknowledge the situation of being not in the normal state. In S30, the control unit 102 switches the completion flag from off to on and terminates the normality determination process.

(Change in Pressure in Normality Determination Process)

Figure 6:
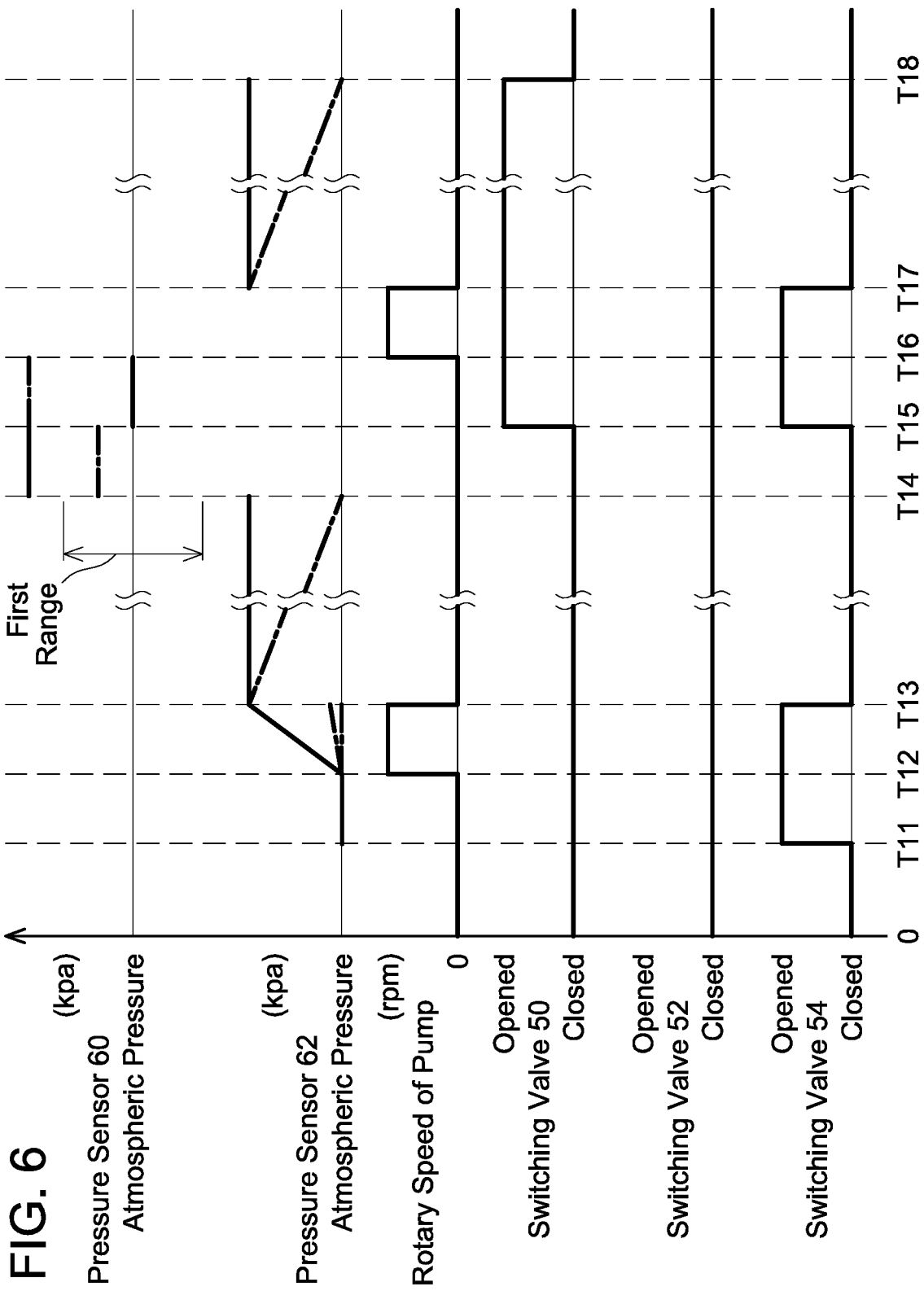
FIG. 6 shows a timing chart of a pressure value in the normality determination process of the first embodiment.

Next, the pressure values detected by the pressure sensors 60, 62 in the normality determination process will be described with reference to FIG. 6. FIG. 6 shows a timing chart indicating the operation and stop of the pump 48, the opening and closing of the switching valves 50, 52, 54, and the pressure values detected by the pressure sensors 60, 62. Before the normality determination process is started, the switching valves 50, 54 are maintained in the closed states. The switching valve 52 is maintained in the closed state during the normality determination process as well as before and after this process. The pump 48 is stopped. Intervals respectively between time T11 and time T18 may not necessarily match actual intervals therebetween.

When the normality determination process is started, firstly, in the downstream-side normality determination process, the switching valve 54 is switched from the closed state to the opened state by the control unit 102 at time T11 (S32). When the switching valve 54 is normally switched from the closed state to the opened state, the air passage 70, the purge passages 18, 24 located on a canister 19 side relative to the switching valves 50, 52, and the canister 19 communicate with the open air. Due to this, the pressures in the air passage 70, the purge passages 18, 24, and the canister 19 become equal to the atmospheric pressure. As a result of this, if the pressure sensor 62 is operating normally, the pressure value detected by the pressure sensor 62 (that is, the pressure value of S34) becomes substantially equal to the atmospheric pressure. On the other hand, if the pressure value detected by the pressure sensor 62 is not substantially equal to the atmospheric pressure (NO to S36), a possibility that a failure is occurring in at least one of the switching valve 54 and the pressure sensor 62 is high. Due to this, the abnormality flag is set to on (S52).

Next, the operation of the pump 48 is started at T12 (S38). If the pump 48 is operating normally and no leak is occurring in the air passage 70, the purge passages 18, 24, the switching valves 50, 52, and the canister 19, the pressures in the air passage 70, the purge passages 18, 24, and canister 19 rise significantly from the atmospheric pressure as shown between time T12 to time T13. As a result of this, at time T13, the pressure value detected by the pressure sensor 62 (that is, the pressure value of S40) becomes higher than the atmospheric pressure, that is, the pressure value of S34 (YES to S42) if the pressure sensor 62 can operate normally. On the other hand, in a case where the pressure value detected by the pressure sensor 62 is not higher than the atmospheric pressure, that is, in a case where the pressure has hardly changed from the pressure before time T12 (two cases thereof are exemplified by one-dot chain lines between time T12 and time T13 of FIG. 6), a possibility that at least one of abnormality and leak in the pump 48 is occurring is high. Due to this, the abnormality flag is set to on (S52).

At time T13, the switching valve 54 is switched to the closed state (S44) and the pump 48 is stopped (S46). If the switching valve 54 is operating normally, the closed space in which the air passage 70, the purge passages 18, 24, and the canister 19 are cut off from the open air is formed by the switching valves 50, 52, 54. As a result of this, if no leak is occurring in the air passage 70, the purge passages 18, 24, the canister 19, and the switching valves 50, 52, 54, the pressure values detected by the pressure sensor 62 (that is, the pressure values of S48) are maintained constant between time T13 and time T14 (NO to S50). During time T12 to time T13, the pressure rises by the operation of the pump 48. Due to this, even if a small amount of leak is occurring in the air passage 70, the purge passages 18, 24, and the canister 19 as well as in the switching valves 50, 52, 54, there is a case in which the pressures may nonetheless rise. On the other hand, during time T13 to time T14, the pressures change even with a small amount of leak. As a result of this, even such a small amount of leak can be found in the processes of S48 to S50. If a leak is occurring, the pressure values detected by the pressure sensor 62 decrease (YES to S50) (exemplified by the one-dot chain lines between time T13 and time T14 of FIG. 6). Due to this, the abnormality flag is set to on (S52).

From time T14 to time T15, the pressure value detected by the pressure sensor 60 is acquired (S62). Before the normality determination process is started, the predetermined period has elapsed since when the vehicle had been stopped (YES to S14). Since the fuel tank 14 is cut off from outside by the switching valve 50 before the normality determination process is started, the pressure value in the fuel tank 14 (that is, the pressure value detected by the pressure sensor 60) varies according to the evaporated fuel amount in the fuel tank 14. The evaporated fuel amount in the fuel tank 14 increases when a temperature surrounding the fuel tank 14 is high, and decreases when this temperature is low. As a result of this, it is possible that the pressure value in the fuel tank 14 (that is, the pressure value acquired in S62) may greatly deviate from the atmospheric pressure. In other words, it can be said that when the pressure in the fuel tank 14 is greatly deviating from the atmospheric pressure, no leak is occurring in the purge passage 17, the switching valve 50, and the fuel tank 14, thus the pressure sensor 60 is operating normally. Further, a situation in which the pressure value in the fuel tank 14 does not greatly deviate from the atmospheric temperature due to the temperature surrounding the fuel tank 14 may also take place.

In the case where the pressure value in the fuel tank 14 greatly deviates from the atmospheric pressure (NO to S64), no leak is occurring in the switching valve 50 or in the fuel tank 14 and the purge passage 17 located upstream of the switching valve 50 and the pressure sensor 60 is operating normally, so the normality determination process is terminated.

On the other hand, in the case where the pressure value in the fuel tank 14 does not greatly deviate from the atmospheric pressure (YES to S64) (as exemplified by a one-dot chain line between time T14 and time T15 of FIG. 6), there is a possibility of an occurrence of a leak or the pressure sensor 60 not operating normally, however, there also may be a case in which no leak is occurring and the pressure sensor 60 is operating normally. As such, in the case where the pressure value in the fuel tank 14 does not greatly deviate from the atmospheric pressure (YES to S64), the second upstream-side normality determination process is executed from time T15.

At time T15, the switching valves 50, 54 are switched from the closed states to the opened states (S72). As a result of this, the fuel tank 14 and the purge passage 17 located upstream of the switching valve 50 are communicated with the open air. Due to this, the pressure in the fuel tank 14 becomes equal to the atmospheric pressure. As a result of this, if the pressure sensor 60 is operating normally, the pressure value detected by the pressure sensor 60 (that is, the pressure value of S74) is substantially equal to the atmospheric pressure between time T15 and time T16. On the other hand, when the pressure value detected by the pressure sensor 60 is not equal to the atmospheric pressure (NO to S76), a possibility of failure in the pressure sensor 60 is high (as shown by a one-dot chain line between T15 and T16 of FIG. 6). In this case, the abnormality flag is not switched to off (that is, S88 is skipped).

At time T16, the operation of the pump 48 is started (S78). If the pump 48 is operating normally and no leak is occurring, the pressure in the fuel tank 14 rises from the atmospheric pressure. Then, at time T17, the switching valve 54 is switched to the closed state (S80) and the pump 48 is stopped (S82). In a case where the switching valve 54 is operating normally, the fuel tank 14 and the purge passage 17 are cut off from the open air. As a result of this, if there is no leak in the fuel tank 14 and the purge passage 17, the pressure values detected by the pressure sensor 62 (that is, the pressure values of S84) are maintained constant (NO to S86) between time T17 and time T18, whereas if a leak is occurring, the pressure values detected by the pressure sensor 62 decrease (YES to S86) (as shown by a one-dot chain line between T17 and T18 of FIG. 6). In this case, the abnormality flag is not switched to off (that is, S88 is skipped).

Effects

In the evaporated fuel processing device 20, the state in which the canister 19 and the fuel tank 14 are communicated and the state in which they are cut off can be switched by the switching valve 50. Due to this, the normal state can be determined by partitioning a space from the fuel tank 14 to the switching valve 52. The state of being communicated with the open air and the state of being cut off therefrom can be switched by the switching valve 54. Further, by controlling the pump 48, the pressure between the fuel tank 14 and the switching valve 52 can be changed. Due to this, the determination on being in the normal state or not can be made with the switching valve 52 by using the switching valves 50, 54 and the pump 48 in the state of being cut off from the intake passage 34. According to this configuration, the determination can be made on whether or not the state in which the purge gas is normally supplied to the intake passage 34 by the evaporated fuel processing device 20 is established, without using passages other than the respective passages 17, 18, 24, 28, 70 that are used for supplying the purge gas to the intake passage 34.

Further, with the switching valve 50 partitioning a fuel tank 14 side relative to the switching valve 50 and a switching valve 52 side relative to the switching valve 50, even in the case where a leak is occurring on the fuel tank 14 side relative to the switching valve 50, the normal state can be determined on the switching valve 52 side relative to the switching valve 50 in the downstream-side normality determination process without being affected by the leak.

Moreover, the normal state on the fuel tank 14 side relative to the switching valve 50 can be determined by using the pressure sensor 60 without being affected by presence/absence of a leak on the switching valve 52 side relative to the switching valve 50.

(Corresponding Relationship)

The switching valve 50 is an example of a "first switching valve", the switching valve 52 is an example of a "third switching valve", and the switching valve 54 is an example of a "second switching valve". The pressure sensor 60 is an example of a "first pressure sensor", and the pressure sensor 62 is an example of a "second pressure sensor". The control unit 102 is an example of a "determining unit" and a "determination device". The state between time T15 and time T16 is an example of a "first state", the state between time T16 and time T17 is an example of a "second state", and the state between time T17 and time T18 is an example of a "third state".

The state between time T11 and time T15 is an example of a "tank non-communicated state". The state between time T11 and time T12 is an example of a "fourth state", time T12 and time T13 is an example of a "fifth state", and the state between time T13 and time T14 is an example of a "sixth state".

Second Embodiment

Figure 7:
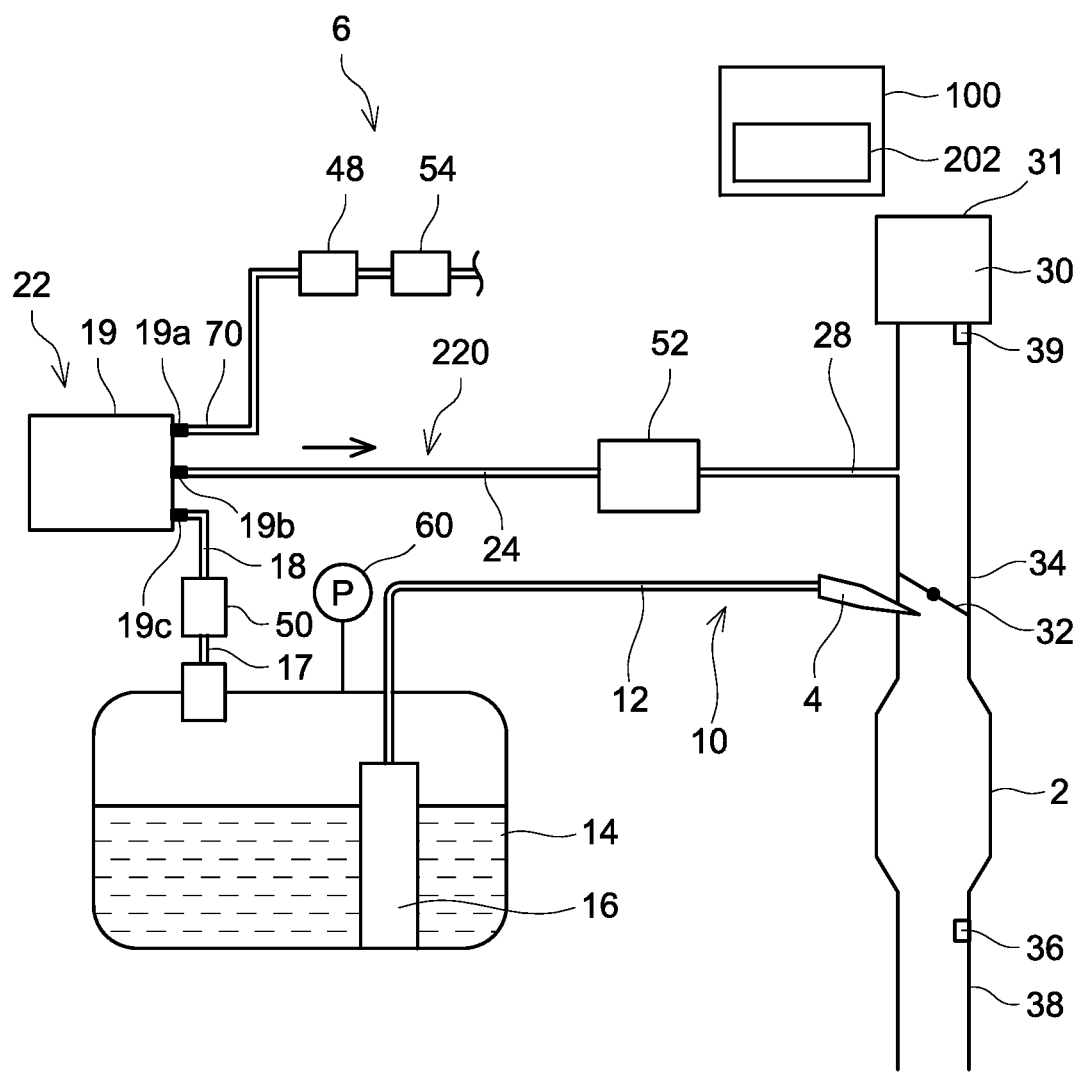
FIG. 7 shows an overview of a fuel supply system of a second embodiment.

An evaporated fuel processing device 220 of the present embodiment will be described in regard to its features different from the evaporated fuel processing device 20 of the first embodiment. As shown in FIG. 7, the evaporated fuel processing device 220 is provided with the pressure sensor 60, however, it is not provided with the pressure sensor 62. Further, a normality determination process which a control unit 202 executes is different from the normality determination process of the first embodiment. Other configurations of the evaporated fuel processing device 220 are same as those of the evaporated fuel processing device 20.

(Normality Determination Process)

The normality determination process which the control unit 202 executes will be described with reference to FIGS. 8 and 9. An execution timing and states of the switching valves 50, 52, 54 and the pump 48 upon starting the process in the present embodiment are same as those of the first embodiment. In the normality determination process of the present embodiment, firstly, the control unit 202 executes processes S212 and S214 that are similar to the processes of S12 and S14. In a case of YES to S214, that is, in a case where the period during which the ignition switch is off is equal to or greater than the predetermined period, the control unit 202 acquires a pressure value detected by the pressure sensor 60 (hereinbelow termed "pressure value of S216") in S216. Then, in S218, the control unit 202 determines whether or not the pressure value of S216 is within the first range similar to S64.

The process proceeds to S220 in a case of the control unit 202 determining that the pressure value of S216 is within the first range (YES to S218), and in a case of the control unit 202 determining that the pressure value of S216 is not within the first range (NO to S218), the control unit 202 switches the switching valves 50, 54 from the closed states to the opened states in S219 similar to S72, and the process proceeds to S224. On the other hand, in S220, the control unit 202 executes processes of S220 to S224 similar to the processes of S72 to S78. Further, in a case of NO to S222, that is, in a case where a pressure value acquired in S221 (hereinbelow termed "pressure value of S221") is determined as not approximating the atmospheric pressure, the process proceeds to S238.

Next, in S226, the control unit 202 acquires a pressure value detected by the pressure sensor 60 (hereinbelow termed "pressure value of S226"). Then, in S228, a determination is made on whether or not a difference in the pressure values of S226 and S221 (≈atmospheric pressure) is equal to or greater than a first threshold. In a case of the control unit 202 determining that the difference in the pressure values is less than the first threshold (NO to S228), the process proceeds to S238. On the other hand, in a case of determining that the difference in the pressure values is equal to or greater than the first threshold (YES to S228), the control unit 202 switches the switching valve 54, which had been switched to the opened state in S220, to the closed state in S230. Then, in S232, the control unit 202 stops the pump 48.

Next, in S234, the control unit 202 acquires pressure values detected by the pressure sensor 60 periodically over a predetermined period (hereinbelow termed "pressure values of S234"), similar to S48 and S84. Then, in S236, the control unit 202 determines whether or not the pressure values of S234 exhibit a change in the predetermined period, similar to S50 and S86. In a case of the control unit 202 determining that the pressure values of S234 do not exhibit a change (NO to S236), the process proceeds to S242. On the other hand, in a case of the control unit 202 determining that the pressure values exhibit a change (YES to S236), the process proceeds to S238. In S238, the control unit 202 switches the abnormality flag from off to on. Then, in each of S240 and S242, the control unit 202 executes a process similar to corresponding one of S28 and S30 and terminates the normality determination process.

(Change in Pressure in Normality Determination Process)

Figure 10:
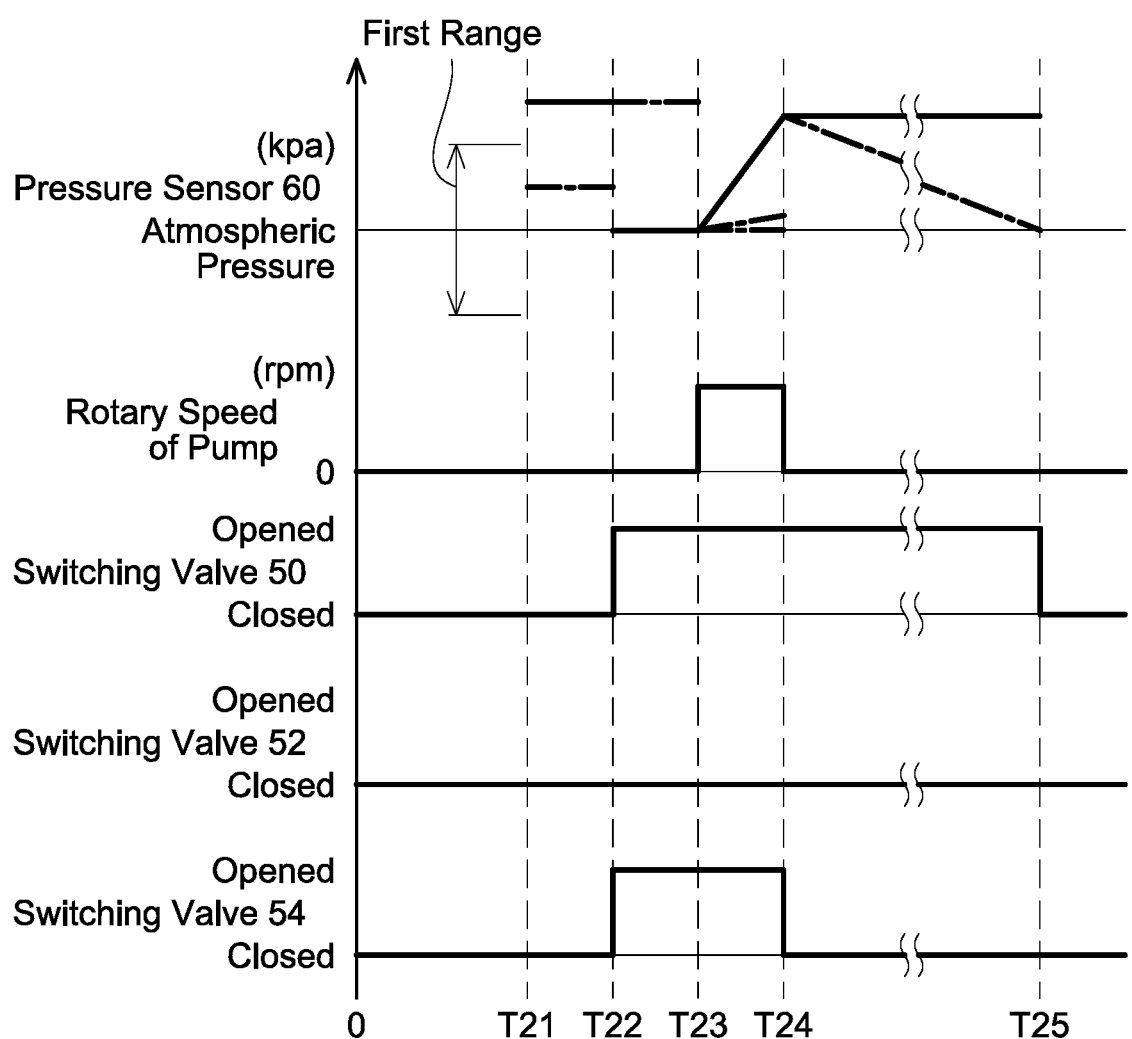
FIG. 10 shows a timing chart of a pressure value in the normality determination process of the second embodiment.

Next, the change in the pressure values detected by the pressure sensor 60 in the normality determination process will be described with reference to FIG. 10. FIG. 10 shows a timing chart indicating the operation and stop of the pump 48, the opening and closing of the switching valves 50, 54, and the pressure values detected by the pressure sensor 60. Before the normality determination process is started, the switching valves 50, 54 are maintained in the closed states. The switching valve 52 is maintained in the closed state during the normality determination process as well as before and after this process. The pump 48 is stopped. Intervals respectively between time T21 and time T25 may not necessarily match actual intervals therebetween.

When the normality determination process is started, the pressure value of S216 is acquired from the pressure sensor 60 by the control unit 102 between time T21 and time T22 in the state where the fuel tank 14 is cut off from outside by the switching valve 50. There is a possibility that the pressure value of S216 greatly deviates from the atmospheric pressure, similar to the pressure value of S62. A situation in which the pressure value in the fuel tank 14 does not greatly deviate from the atmospheric temperature due to the temperature surrounding the fuel tank 14 may also take place.

In the case where the pressure value in the fuel tank 14 greatly deviates from the atmospheric pressure, no leak is occurring in the switching valve 50 or in the fuel tank 14 and the purge passage 17 located upstream of the switching valve 50 and the pressure sensor 60 is operating normally (NO to S218). Due to this, processes of S220 to S222 are skipped in the normality determination process, and the process proceeds to S224. That is, time T22 to time T23 are omitted.

On the other hand, in the case where the pressure value in the fuel tank 14 does not greatly deviate from the atmospheric pressure (YES to S218), there is the possibility of the occurrence of a leak or the pressure sensor 60 not operating normally, however, there also may be a case in which no leak is occurring and the pressure sensor 60 is operating normally. As such, in the case where the pressure value in the fuel tank 14 does not greatly deviate from the atmospheric pressure (YES to S218), the switching valves 50, 54 are switched from the closed states to the opened states at time T22 (S220). As a result of this, the fuel tank 14 and the purge passage 17 located upstream of the switching valve 50 communicate with the open air. By doing so, the pressure in the fuel tank 14 becomes equal to the atmospheric pressure. As a result of this, if the pressure sensor 60 is operating normally, the pressure value detected by the pressure sensor 60 (that is, the pressure value of S221) is substantially equal to the atmospheric pressure between time T22 and time T23. On the other hand, when the pressure value detected by the pressure sensor 60 is not equal to the atmospheric pressure (NO to S222), the possibility of failure in the pressure sensor 60 is high. Due to this, the abnormality flag is set to on (S238).

At time T23, the operation of the pump 48 is started (S224). If the pump 48 is operating normally and no leak is occurring, the pressure in the fuel tank 14 (that is, the pressure value of S226) rises from the atmospheric pressure between time T23 and time T24 (that is, YES to S228). On the other hand, in a case where the pressure value detected by the pressure sensor 60 is not higher than the atmospheric pressure, that is, in a case where the pressure has hardly changed from the pressure before time T23 (two cases thereof are exemplified by one-dot chain lines between time T23 and time T24 of FIG. 6), the possibility that at least one of abnormality and leak in the pump 48 is occurring is high. Due to this, the abnormality flag is set to on (S238).

Next, at time T24, the switching valve 54 is switched to the closed state (S230) and the pump 48 is stopped (S232). In the case where the switching valves 52, 54 are operating normally, the fuel tank 14, the purge passages 17, 18, 24, the canister 19, and the air passage 70 are cut off from the open air. As a result of this, if no leak is occurring in the fuel tank 14, the purge passages 17, 18, 24, the canister 19, and the air passage 70, the pressure values detected by the pressure sensor 60 (that is, the pressure values of S234) are maintained constant between time T24 and time T25 (NO to S236), whereas on the other hand, if a leak is occurring, the pressure values detected by the pressure sensor 60 decrease (YES to S236). Due to this, the abnormality flag is set to on (S238).

Effects

In the evaporated fuel processing device 220, the determination can be made on whether or not the state in which the purge gas is normally supplied to the intake passage 34 by the evaporated fuel processing device 220 is established, without using passages other than the respective passages 17, 18, 24, 28, 70 that are used for supplying the purge gas to the intake passage 34, similar to the evaporated fuel processing device 20.

Further, in the situation where the purge passages 17, 18 are closed by the switching valve 50, the evaporated fuel amount in the fuel tank 14 changes by the ambient temperature of the fuel tank 14. If there is no leak on the fuel tank 14 side relative to the switching valve 50, the pressure on the fuel tank 14 side relative to the switching valve 50 changes according to the change in the evaporated fuel amount in the fuel tank 14. In the normal state, when the state in which the purge passages 17, 18 are closed is switched to the state in which they are opened by the switching valve 50 and the state in which the air passage 70 is closed is switched to the state in which it is opened by the switching valve 54 at time T22, the fuel tank 14 side relative to the switching valve 50 communicates with the open air and the pressure in the fuel tank 14 thereby changes. During time T22 to time T23, the determination on being in the normal state or not can be made by using the pressure sensor 60. Further, in the case of being in the normal state, the pressure value detected by the pressure sensor 60 changes by the operation of the pump 48 during time T23 to time T24. Due to this, the determination on being in the normal state or not can be made by using the pressure sensor 60. During time T24 to time T25, the passage between the fuel tank 14 and the switching valve 52 is cut off from the open air in the state where the pressure is changing from the atmospheric pressure by the operation of the pump 48. On the other hand, if a leak is occurring in the passage between the fuel tank 14 and the switching valve 52, the pressure thereby changes. Due to this, the determination on the normal state including the leak in the passage between the fuel tank 14 and the switching valve 52 can be made between time T24 and time T25.

Further, if there is no leak on the fuel tank side relative to the switching valve 50, in the situation where the purge passages 17, 18 are closed by the switching valve 50, the evaporated fuel amount in the fuel tank 14 changes by the ambient temperature of the fuel tank 14. According to this configuration, the normal state including the presence/absence of a leak on the fuel tank 14 side relative to the switching valve 50 can be determined in S216 to S218.

(Corresponding Relationship)

The control unit 202 is an example of the "determining unit" and the "determination device". The state between time T22 and time T23 is an example of the "first state", the state between time T23 and time T24 is an example of the "second state", and the state between time T24 and time T25 is an example of the "third state". The state between time T21 and time T22 is an example of the "tank non-communicated state".

Third Embodiment

Figure 11:
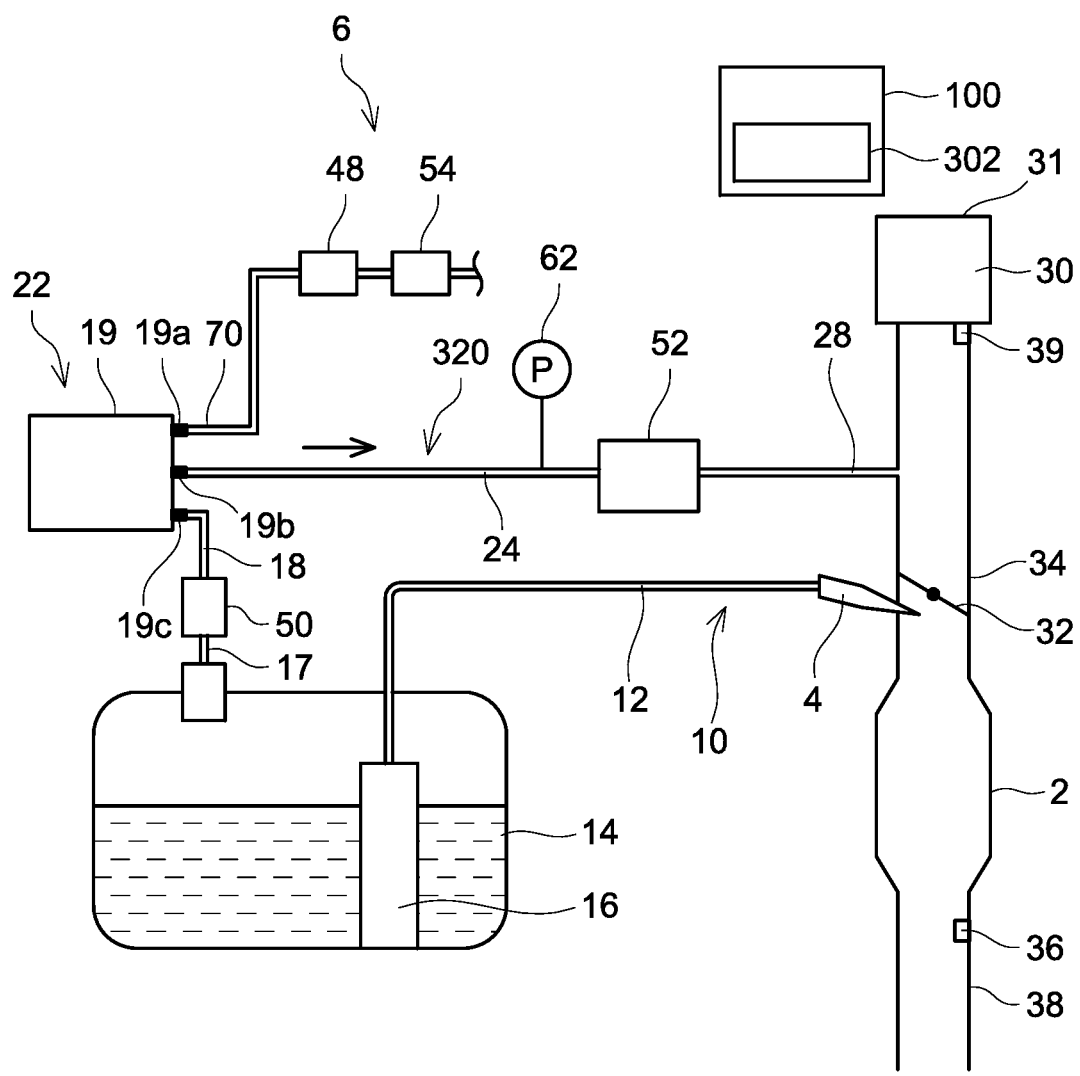
FIG. 11 shows an overview of a fuel supply system of a third embodiment.

An evaporated fuel processing device 320 of the present embodiment will be described in regard to its features different from the evaporated fuel processing device 20 of the first embodiment. As shown in FIG. 11, the evaporated fuel processing device 320 is provided with the pressure sensor 62, however, it is not provided with the pressure sensor 60. Further, a normality determination process which a control unit 302 executes is different from the normality determination process of the first embodiment. Other configurations of the evaporated fuel processing device 320 are same as those of the evaporated fuel processing device 20.

(Normality Determination Process)

Figure 12:
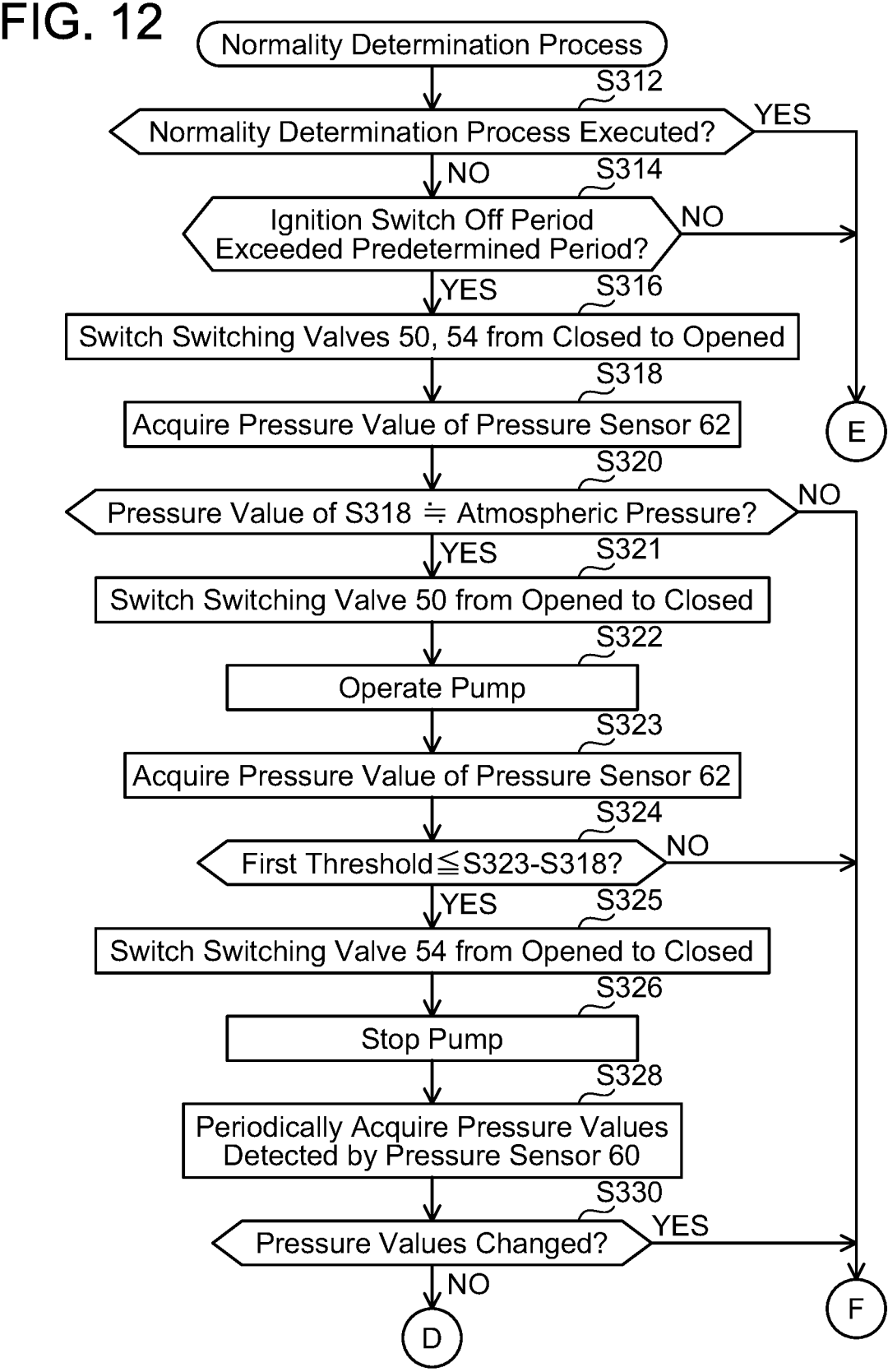
FIG. 12 shows a flowchart of a normality determination process of the third embodiment.
Figure 13:
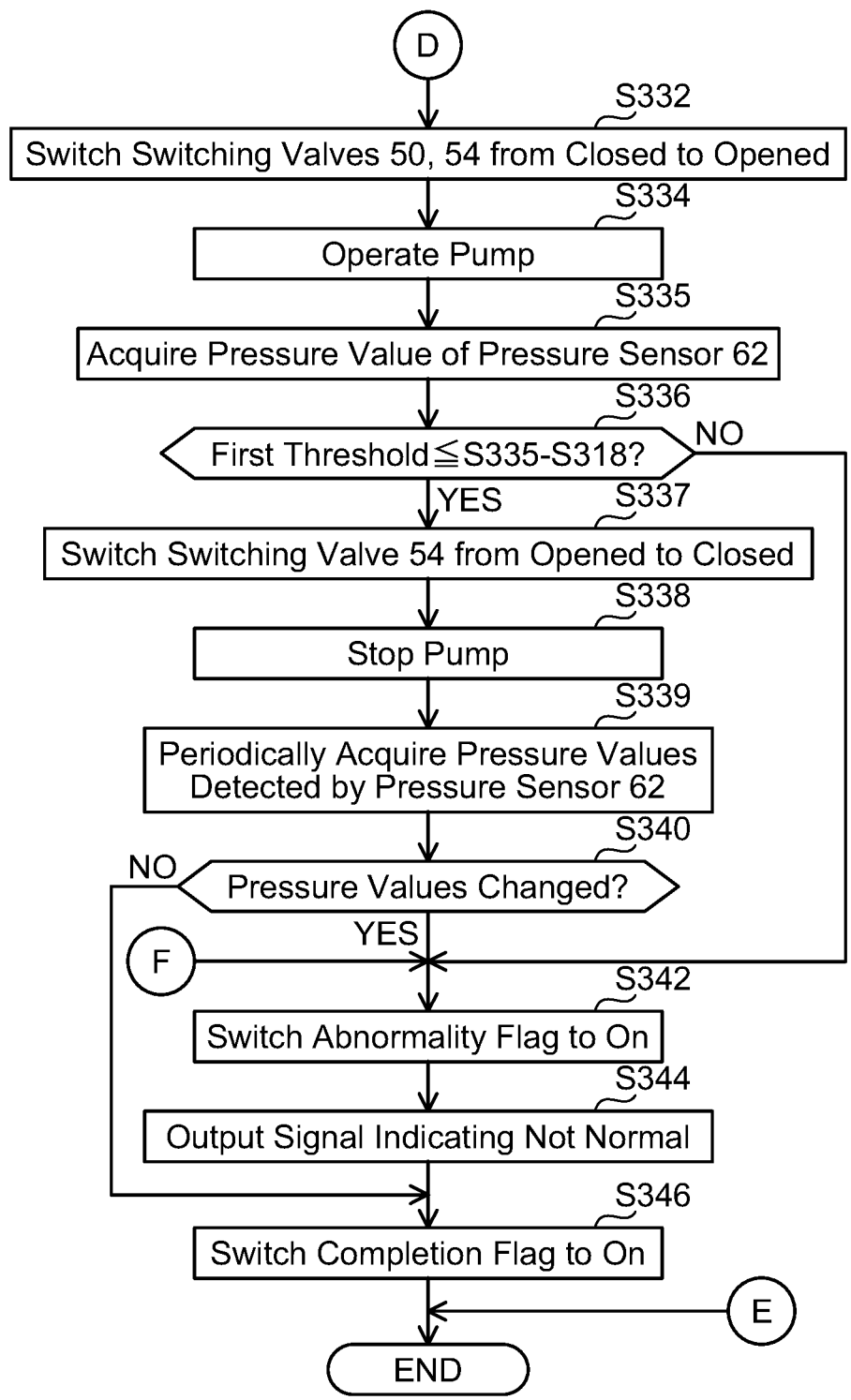
FIG. 13 shows a flowchart of the normality determination process continued from FIG. 12.

The normality determination process which the control unit 302 executes will be described with reference to FIGS. 12 and 13. An execution timing and states of the switching valves 50, 52, 54 and the pump 48 upon starting the process in the present embodiment are same as those of the first embodiment. In the normality determination process of the present embodiment, firstly, the control unit 302 executes processes S312 and S314 that are similar to the processes of S12 and S14. In a case of YES to S314, that is, in a case where the period during which the ignition switch is off is equal to or greater than the predetermined period, the process proceeds to S316. After proceeding to S316, the control unit 302 executes processes S316 to S320 that are similar to the processes of S72 to S76. In the processes of S318 and S320, the pressure value detected by the pressure sensor 62 is used. Further, in a case of NO to S320, that is, in a case where the pressure value acquired in S318 (hereinbelow termed "pressure value of S318") does not approximate to the atmospheric pressure, the process proceeds to S342.

In a case of YES to S320, the control unit 302 switches the switching valve 50 from the opened state to the closed state in S321. Then, in S322, the control unit 302 operates the pump 48. Then, in S323, the control unit 302 acquires a pressure value detected by the pressure sensor 62 (hereinbelow termed "pressure value of S323"). Then, in S324, the control unit 302 determines whether or not a value which is obtained by subtracting the pressure value of S318, which is the pressure value substantially equal to the atmospheric pressure, from the pressure value of S323 is equal to or greater than a first threshold.

In a case where the value that subtracted the pressure value of S318 from the pressure value of S323 is determined as being less than the first threshold (NO to S324), the process proceeds to S342. On the other hand, in a case where the value that subtracted the pressure value of S318 from the pressure value of S323 is determined as being equal to or greater than the first threshold (YES to S324), the control unit 302 switches the switching valve 54 from the opened state to the closed state in S325. Then, in S326, the control unit 302 stops the pump 48.

Next, in S328, the control unit 302 acquires pressure values detected by the pressure sensor 62 periodically over a predetermined period, similar to S48 and S84. Then, in S330, the control unit 302 determines whether or not the pressure values detected in S328 over the predetermined period (hereinbelow termed "pressure values of S328") exhibit a change, similar to S50 and S86. In a case of determining that the pressure values of S328 do not exhibit a change (NO to S330), the process proceeds to S332. On the other hand, in a case of determining that the pressure values exhibit a change (YES to S330), the process proceeds to S342.

In S332, the control unit 302 switches the switching valves 50, 54 from the closed states to the opened state. Then, in S334, the control unit 302 operates the pump 48. Then, in S335, the control unit 302 acquires a pressure value detected by the pressure sensor 62 (hereinbelow termed "pressure value of S335"). Then, in S336, the control unit 302 determines whether or not a value which is obtained by subtracting the pressure value of S318, which is the pressure value substantially equal to the atmospheric pressure, from the pressure value of S335 is equal to or greater than a predetermined first threshold (such as 6 kPa).

In a case where the value that subtracted the pressure value of S318 from the pressure value of S335 is less than the first threshold (NO to S3364), the process proceeds to S342. On the other hand, in a case where the value that subtracted the pressure value of S318 from the pressure value of S335 is equal to or greater than the first threshold (YES to S336), the control unit 302 switches the switching valve 54 from the opened state to the closed state in S337. Then, in S338, the control unit 302 stops the pump 48. Then, in S339, the control unit 302 acquires pressure values detected by the pressure sensor 62 periodically over a predetermined period, similar to S328. Then, in S5340, the control unit 302 determines whether or not the pressure values detected in S339 over the predetermined period (hereinbelow termed "pressure values of S339") exhibit a change, similar to S330.

In a case of the control unit 302 determining that the pressure values of S339 do not exhibit a change (NO to S340), the process proceeds to S346. On the other hand, in a case of determining that the pressure values exhibit a change (YES to S340), the process proceeds to S342. In S342, the control unit 302 switches the abnormality flag from off to on. Then, in each of S344 and S346, the control unit 302 executes a process similar to corresponding one of S28 and S30 and terminates the normality determination process.

(Change in Pressure in Normality Determination Process)

Figure 14:
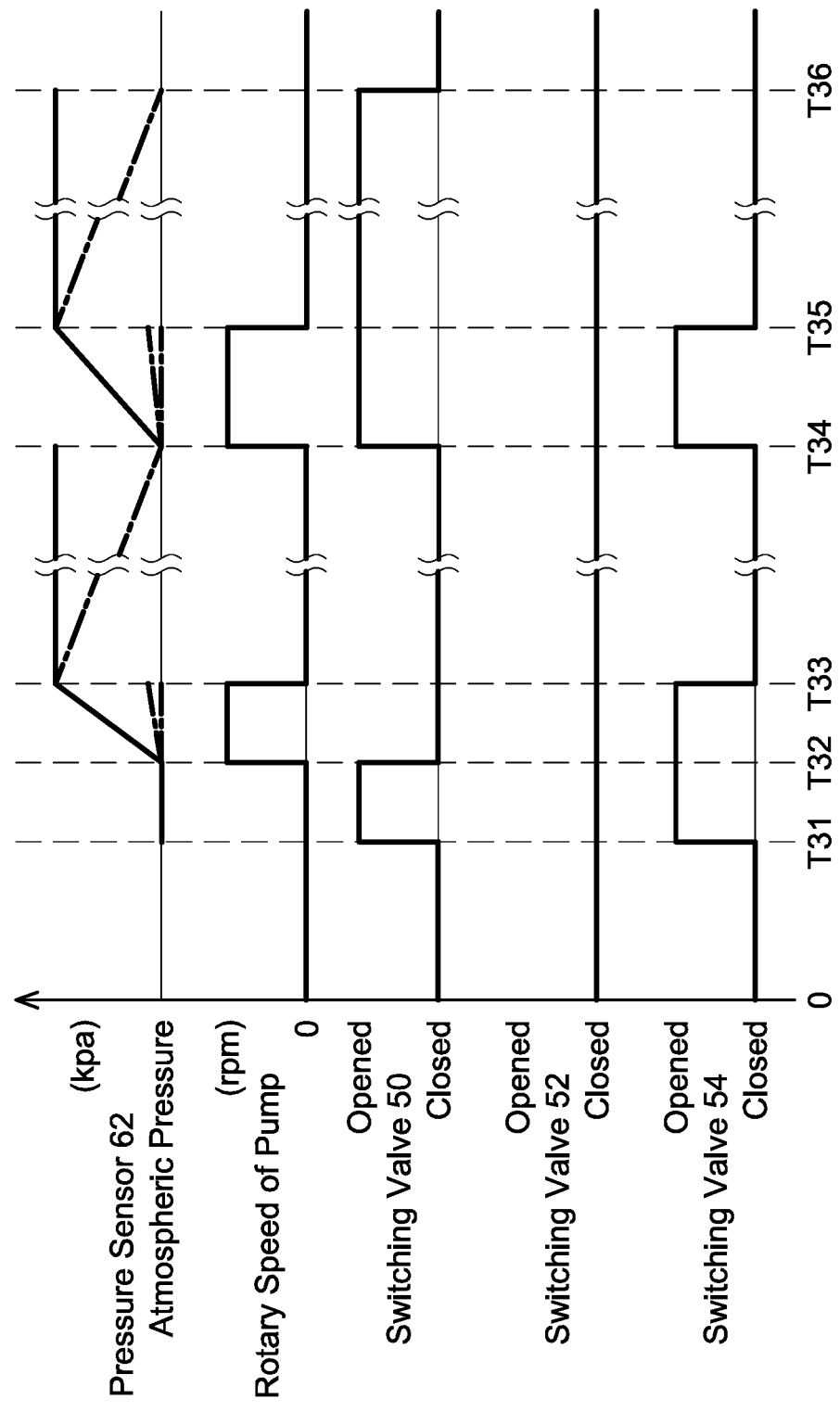
FIG. 14 shows a timing chart of a pressure value in the normality determination process of the third embodiment.

Next, the change in the pressure values detected by the pressure sensor 62 in the normality determination process will be described with reference to FIG. 14. FIG. 14 shows a timing chart indicating the operation and stop of the pump 48, the opening and closing of the switching valves 50, 54, and the pressure values detected by the pressure sensor 62. Before the normality determination process is started, the switching valves 50, 54 are maintained in the closed states. The switching valve 52 is maintained in the closed state during the normality determination process as well as before and after this process. The pump 48 is stopped.

When the normality determination process is started, the switching valves 50, 54 are switched from the closed states to the opened states by the control unit 302 at time T31 (S316). As a result of this, if the switching valves 50, 54 are operating normally, the fuel tank 14, the purge passages 17, 18, 24, the canister 19, and the air passage 70 communicate with the open air, and come to have substantially the atmospheric pressure. As a result of this, if the pressure sensor 62 is operating normally, the pressure value detected by the pressure sensor 62 (that is, the pressure value of S318) is substantially equal to the atmospheric pressure (YES to S320) during time T31 to time T32. On the other hand, if the pressure value detected by the pressure sensor 62 is not substantially equal to the atmospheric pressure (NO to S320), a possibility of failure occurring in one or more of the pressure sensor 62 and the switching valves 50, 54 is high. Due to this, the abnormality flag is set to on (S342).

At time T32, the switching valve 50 is switched from the opened state to the closed state (S321) and the operation of the pump 48 is started (S322). If the pump 48 is operating normally and no leak is occurring, the pressures in the purge passages 18, 24, the canister 19, and the air passage 70 (that is, the pressure value of S323) rise from the atmospheric pressure between time T32 and time T33 (that is, YES to S324). On the other hand, in a case where the pressure value detected by the pressure sensor 62 is not higher than the atmospheric pressure, that is, in a case where the pressure has hardly changed from the pressure before time T32 (two cases thereof are exemplified by one-dot chain lines between time T32 and time T33 of FIG. 14), the possibility that at least one of abnormality and leak in the pump 48 is occurring is high. Due to this, the abnormality flag is set to on (S342).

Next, at time T33, the switching valve 54 is switched to the closed state (S325) and the pump 48 is stopped (S326). In the case where the switching valves 52, 54 are operating normally, the fuel tank 14, the purge passages 17, 18, 24, the canister 19, and the air passage 70 are cut off from the open air. As a result of this, if no leak is occurring in the fuel tank 14, the purge passages 17, 18, 24, the canister 19, and the air passage 70, the pressure values detected by the pressure sensor 62 (that is, the pressure values of S328) are maintained constant between time T33 and time T34 (NO to S330), whereas on the other hand, if a leak is occurring, the pressure values detected by the pressure sensor 62 decrease (YES to S330) (as exemplified by a one-dot chain line between time T33 and time T34 of FIG. 14). Due to this, the abnormality flag is set to on (S342).

Next, at time T34, the switching valves 50, 54 are switched from the closed states to the opened states (S332) and the pump 48 is operated (S334). If there is no leak in the fuel tank 14 and the purge passage 17 that are on the fuel tank 14 side relative to the switching valve 50, the pressures in the fuel tank 14, the purge passages 17, 18, 24, the canister 19, and the air passage 70 (that is, the pressure value of S335) rise from the atmospheric pressure between time T34 and time T35 (that is, YES to S336). On the other hand, in a case where the pressure value detected by the pressure sensor 62 is not higher than the atmospheric pressure, that is, in a case where the pressure has hardly changed from the pressure before time T34 (two cases thereof are exemplified by one-dot chain lines between time T34 and time T35 of FIG. 14), the possibility that a leak is occurring in one of the fuel tank 14 and the purge passage 17 is high. Due to this, the abnormality flag is set to on (S342).

Next, at time T35, the switching valve 54 is switched to the closed state (S337) and the pump 48 is stopped (S338). Due to this, the fuel tank 14, the purge passages 17, 18, 24, the canister 19, and the air passage 70 are cut off from the open air. As a result of this, if there is no leak in the fuel tank 14 and the purge passage 17, the pressure values detected by the pressure sensor 62 (that is, the pressure values of S339) are maintained constant between time T35 and time T36 (NO to S340), whereas in the case where a leak is occurring, the pressure values detected by the pressure sensor 62 decrease (YES to S340) (as exemplified by a one-dot chain line between time T35 and time T36 of FIG. 14). Due to this, the abnormality flag is set to on (S342).

Effects

In the evaporated fuel processing device 320, the determination can be made on whether or not the state in which the purge gas is normally supplied to the intake passage 34 by the evaporated fuel processing device 320 is established, without using passages other than the respective passages 17, 18, 24, 28, 70 that are used for supplying the purge gas to the intake passage 34, similar to the evaporated fuel processing device 20.

Further, in the normal state, the fuel tank 14, the purge passages 17, 18, 24, the canister 19, and the air passage 70 are communicated with the open air at time T31 when the purge passages 17, 18 are opened by the switching valve 50 and the air passage 70 is opened by the switching valve 54. Due to this, during time T31 to T32, the determination on being in the normal state or not can be made by using the pressure sensor 62. Further, in the case of being in the normal state, the pressure value detected by the pressure sensor 62 changes by the operation of the pump 48 during time T34 to time T35. Due to this, the determination on being in the normal state or not can be made by using the pressure sensor 62 during time T34 to time T35. Moreover, in the case of being in the normal state, the passage between the fuel tank 14 and the switching valve 52 is cut off from the open air during time T35 to time T36 in the state where the pressure is changing from the atmospheric pressure by the operation of the pump 48. On the other hand, if a leak is occurring between the fuel tank 14 and the switching valve 52, the pressure thereby changes. Due to this, the determination on the normal state including the leak between the fuel tank 14 and the switching valve 52 can be made between time T35 and time T36.

Further, during time T32 to time T34, due to the purge passages 17, 18 being closed by the switching valve 50, the normal state of the purge passages 18, 24, the canister 19, and the air passage 70 on the switching valve 52 side relative to the switching valve 50 including presence/absence of a leak can be determined without being affected by the presence/absence of a leak in the fuel tank 14 and the purge passage 17 on the fuel tank 14 side relative to the switching valve 50.

(Corresponding Relationship)

The control unit 302 is an example of the "determining unit" and the "determination device". The state between time T31 and time T32 is an example of the "first state", the state between time T34 and time T35 is an example of the "second state", and the state between time T35 and time T36 is an example of the "third state".

While specific examples of the present disclosure have been described above in detail, these examples are merely illustrative and place no limitation on the scope of the patent claims. The technology described in the patent claims also encompasses various changes and modifications to the specific examples described above.

(1) In the above first embodiment, the switching valve 54 is closed in S80, however, the switching valve 50 may be closed instead of the switching valve 54 or together with the switching valve 54. In these cases, the processes of S84 and S86 may be executed using the pressure value detected by the pressure sensor 60.

(2) In the above first and second embodiments, the pressure sensor 60 may be disposed somewhere other than the fuel tank 14. In this case, it may be disposed on the fuel tank 14 side relative to the switching valve 50, such as on the purge passage 17. Similarly, in the above first and second embodiments, a position of the pressure sensor 62 may be somewhere other than the purge passage 24. In this case, it may be disposed between the switching valves 50, 52, 54, such as on the canister 19, the purge passage 18, or on the air passage 70.

(3) In each of the above embodiments, a configuration that is not normal is not specified in the case of not being in the normal state. However, the configuration that is not normal may be specified. For example, in S36 of the downstream-side normality determination process of the first embodiment, it may be specified therein that the pressure sensor 62 or the switching valve 54 is not operating normally in the case of determining that the pressure value of S34 does not approximate the atmospheric pressure (NO to S36). Further, in S42, it may be specified therein that the pump 48 or the pressure sensor 62 is not operating normally or a leak is occurring in at least one location on the purge passages 18, 24, the switching valve 52, the canister 19, and the air passage 70 in the case of determining that the difference between the pressure value of S40 and the pressure value of S34 is less than the first threshold (NO to S42). The same applies to other processes as well.

Figure 8:
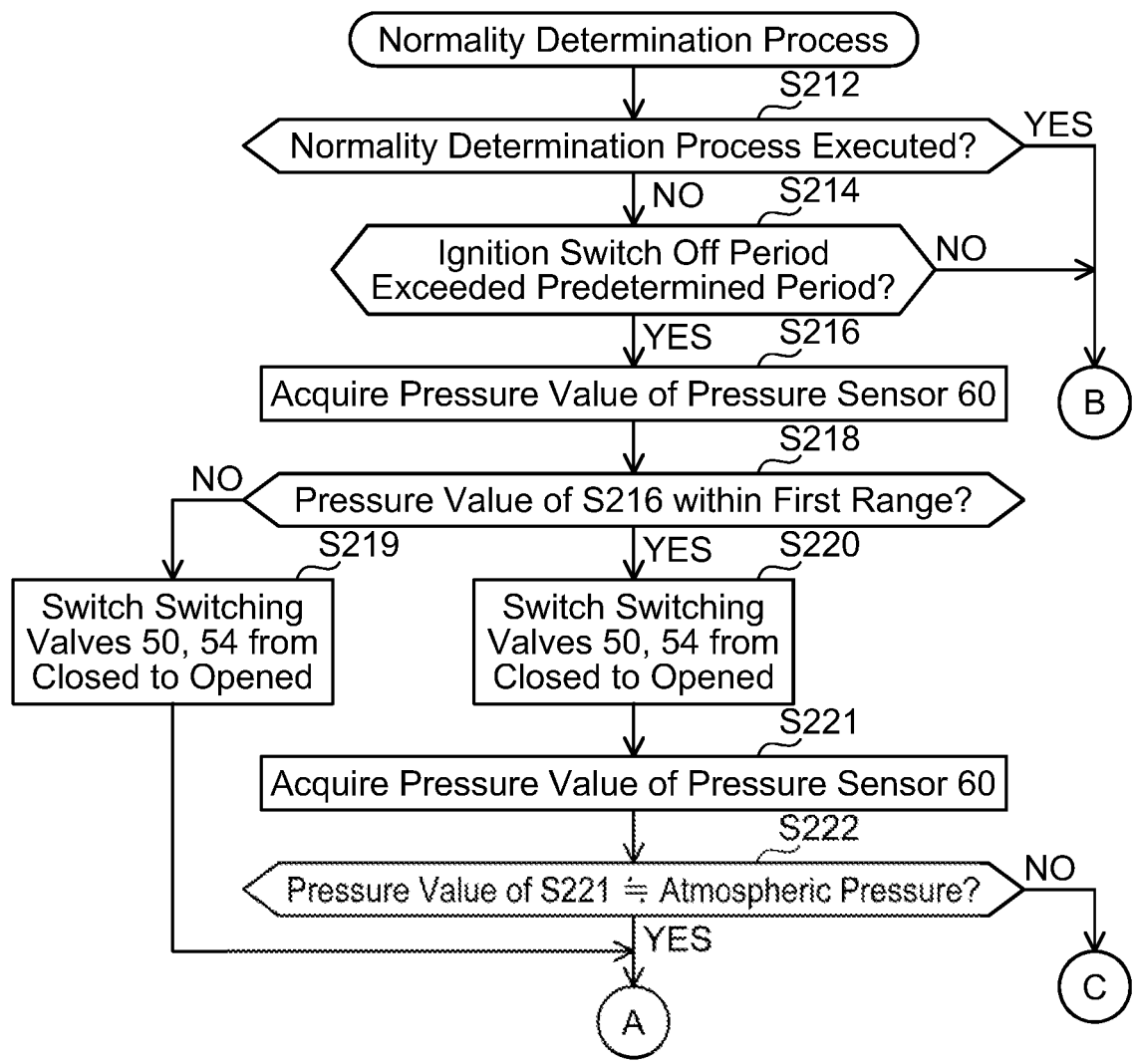
FIG. 8 shows a flowchart of a normality determination process of the second embodiment.
Figure 9:
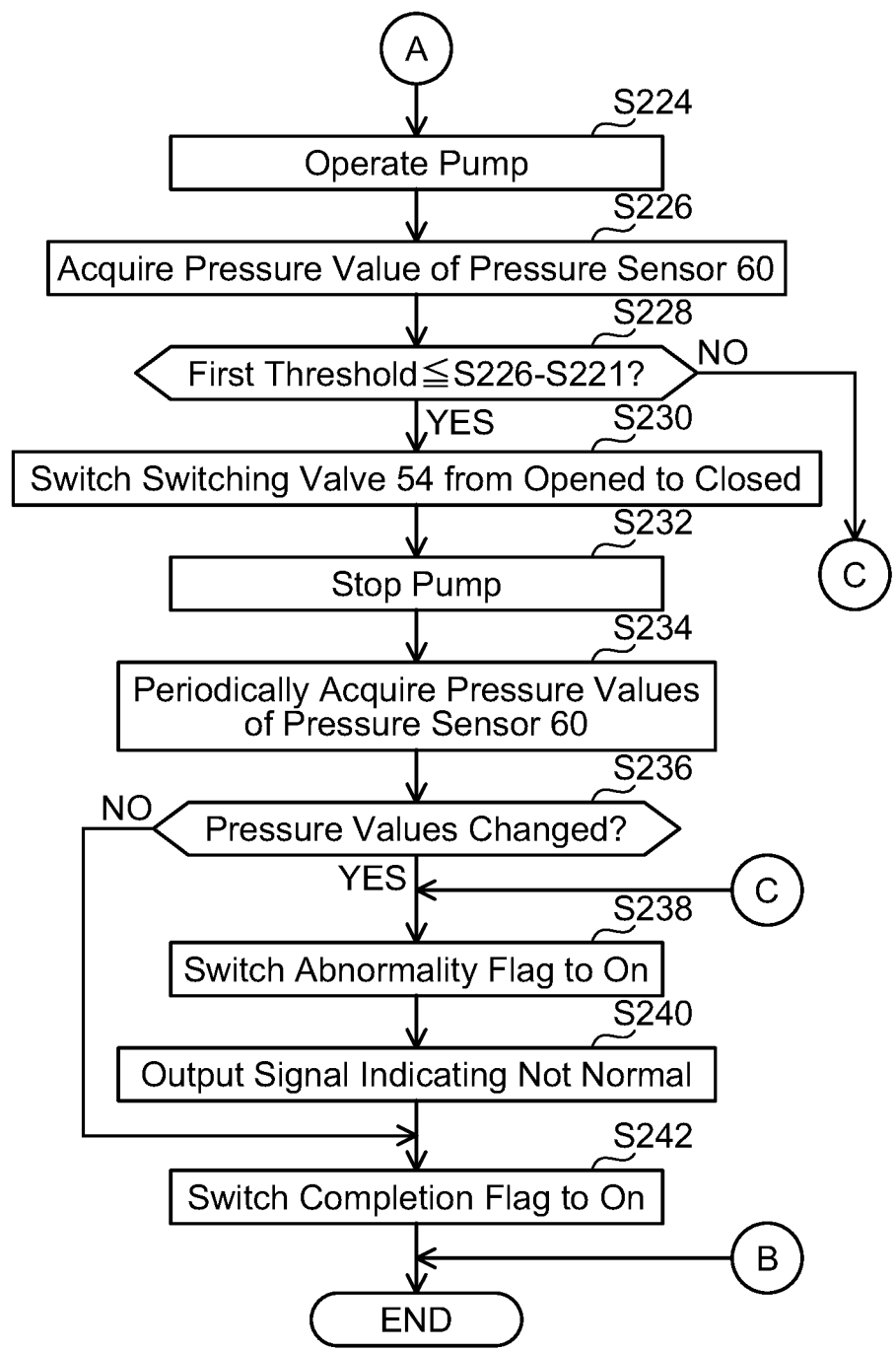
FIG. 9 shows a flowchart of the normality determination process continued from FIG. 8.

(4) In the second embodiment, in the case of NO to S218 in the normality determination process of FIG. 8, the processes of S220 to S222 are skipped after the process of S219. However, in the case of NO to S218, the processes of S220 to S222 may be executed without executing the process of S219. In this case, the control unit 202 may determine that there is no leak in the fuel tank 14, the purge passage 17, and the switching valve 50 in the case of NO to S218. Then, in the case of NO to S222, it may determine that the pressure sensor 60 is not operating normally.

(5) A supercharger may be disposed between the throttle valve 32 and the air cleaner 30. The supercharger may be a so-called turbocharger of which turbine is rotated by exhaust from the engine 2 to introduce air to the engine 2.

(6) An order of execution of respective processes of the normality determination process, the downstream-side determination process, the first upstream-side determination process, and the second upstream-side determination process in the first embodiment may suitably be changed. For example, in the normality determination process, the first upstream-side determination process and the second upstream-side determination process may be executed first and the downstream-side determination process may be executed later. Further, in the first embodiment, at least one of the downstream-side determination process, the first upstream-side determination process, and the second upstream-side determination process may not be executed. Further, at least one process included in either the downstream-side determination process, the first upstream-side determination process, or the second upstream-side determination process may not be executed.

(7) An order of execution of respective processes in the normality determination process of the second embodiment may suitably be changed. Further, among the processes of S212 to S242 of the normality determination process, at least one of the processes may not be executed. For example, the processes of S216, S218, and S219 may not be executed.

(8) An order of execution of respective processes in the normality determination process of the third embodiment may suitably be changed. Further, among the processes of S312 to S346 of the normality determination process, at least one of the processes may not be executed. For example, the processes of S321 to S332 may not be executed.

(9) In the above embodiments, the purge passage 28 is connected to the intake passage 34 on a upstream side relative to the throttle valve 32, however, in addition to or as an alternative to this, the purge passage 28 may be connected to the intake passage 34 on an downstream side relative to the throttle valve 32. For example, in a case where a supercharger is disposed on the upstream side relative to the throttle valve 32, the purge passage 28 on the upstream side relative to the throttle valve 32 may be connected to the intake passage 34 on an upstream side relative to the supercharger.

(10) The control unit 102 may be provided separately from the ECU 100.

(11) The switching valves 50, 52, 54 may be valves of which aperture areas can be adjusted, such as butterfly valves. In such a case, the control units 102, 202, 302 may adjust an aperture of the switching valve 52 in the purge process.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

The invention claimed is:
1. An evaporated fuel processing device comprising:
a canister disposed on a purge passage communicating a fuel tank and an intake passage of an engine, and configured to store evaporated fuel generated in the fuel tank;
a pump disposed on an air passage communicating the canister and open air, the air passage being different from the purge passage;
a first switching valve disposed between the canister and the fuel tank, and configured to switch the purge passage between being opened and closed;
a second switching valve disposed on the air passage, and configured to switch the air passage between being opened and closed;
a pressure detector comprising at least one of a first pressure sensor disposed on a fuel tank side relative to the first switching valve and a second pressure sensor disposed on an intake passage side relative to the first switching valve, the second switching valve, and the pump; a third switching valve disposed on the purge passage on an intake passage side relative to the canister and the pressure detector, and configured to switch the purge passage between being opened and closed; and
a determining unit configured to determine whether or not the evaporated fuel processing device is in a normal state in which the evaporated fuel is normally supplied to the intake passage,
wherein
the determining unit is configured to determine whether or not the evaporated fuel processing device is in the normal state, by using pressures detected by the pressure detector during transitions between a first state, a second state, and a third state, wherein the first state is a state in which the purge passage is opened by the first switching valve, the air passage is opened by the second switching valve, the purge passage is closed by the third switching valve, and the pump is stopped, the second state is a state which takes place after the first state and in which the purge passage is opened by the first switching valve, the air passage is opened by the second switching valve, the purge passage is closed by the third switching valve, and the pump is operating, and the third state is a state which takes place after the second state and in which the purge passage is opened by the first switching valve, the air passage is closed by the second switching valve, the purge passage is closed by the third switching valve, and the pump is stopped.

2. The evaporated fuel processing device as in claim 1, wherein
the pressure detector comprises the first pressure sensor and the second pressure sensor, and
the determining unit is configured to determine whether or not the evaporated fuel processing device is in the normal state on a third switching valve side relative to the first switching valve, by using the pressure detected by the second pressure detector in a tank non-communicated state, which takes place before the first state and in which the purge passage is closed by the first switching valve and the third switching valve.

3. The evaporated fuel processing device as in claim 2, wherein
the determining unit is configured to determine whether or not the evaporated fuel processing device is in the normal state on the third switching valve side relative to the first switching valve, by using the pressure detected by the second pressure sensor in each of a fourth state, a fifth state and a sixth state, wherein
the fourth state is a state in which the air passage is opened by the second switching valve and the pump is stopped,
the fifth state is a state which takes place after the fourth state and in which the air passage is opened by the second switching valve and the pump is operating, and
the sixth state is a state which takes place after the fifth state and in which the air passage is closed by the second switching valve and the pump is stopped.

4. The evaporated fuel processing device as in claim 2, wherein
the determining unit is configured to determine whether or not the evaporated fuel processing device is in the normal state on the fuel tank side relative to the first switching valve, by using the pressure detected by the first pressure detector in the tank non-communicated state.

5. The evaporated fuel processing device as in claim 1, wherein
the pressure detector comprises the first pressure sensor, and
the determining unit is configured to determine whether or not the evaporated fuel processing device is in the normal state by using the pressure detected by the first pressure detector in each of the first state, the second state, and the third state.

6. The evaporated fuel processing device as in claim 1, wherein
the pressure detector comprises the first pressure sensor, and
the determining unit is configured to determine whether or not the evaporated fuel processing device is in the normal state on the fuel tank side relative to the first switching valve, by using the pressure detected by the first pressure detector in a tank non-communicated state which takes place before the first state and in which the purge passage is closed by the first switching valve and the third switching valve.

7. The evaporated fuel processing device as in claim 1, wherein
the pressure detector comprises the second pressure sensor, and
the determining unit is configured to determine whether or not the evaporated fuel processing device is in the normal state, by using the pressure detected by the second pressure detector in each of the first state, the second state, and the third state.

8. A determining device mounted in an evaporated fuel processing device which comprises:
a canister disposed on a purge passage communicating a fuel tank and an intake passage of an engine, and configured to store evaporated fuel generated in the fuel tank;
a pump disposed on an air passage communicating the canister and open air, the air passage being different from the purge passage;
a first switching valve disposed between the canister and the fuel tank, and configured to switch the purge passage between being opened and closed;
a second switching valve disposed on the air passage, and configured to switch the air passage between being opened and closed;
a pressure detector comprising at least one of a first pressure sensor disposed on a fuel tank side relative to the first switching valve and a second pressure sensor disposed on an intake passage side relative to the first switching valve, the second switching valve, and the pump; and
a third switching valve disposed on the purge passage on an intake passage side relative to the canister and the pressure detector, and configured to switch the purge passage between being opened and closed,
the determining unit is configured to determine whether or not the evaporated fuel processing device is in a normal state in which the evaporated fuel is normally supplied to the intake passage, by using pressures detected by the pressure detector while the evaporated fuel processing device shifts between a first state, a second state, and a third state, wherein
the first state is a state in which the purge passage is opened by the first switching valve, the air passage is opened by the second switching valve, the purge passage is closed by the third switching valve, and the pump is stopped,
the second state is a state which takes place after the first state and in which the purge passage is opened by the first switching valve, the air passage is opened by the second switching valve, the purge passage is closed by the third switching valve, and the pump is operating, and
the third state is a state which takes place after the second state and in which the purge passage is opened by the first switching valve, the air passage is closed by the second switching valve, the purge passage is closed by the third switching valve, and the pump is stopped.

9. The evaporated fuel processing device as in claim 1, wherein
the pressure detector comprises the first pressure sensor, and
the determining unit is configured to determine whether or not the evaporated fuel processing device is in the normal state on the fuel tank side relative to the first switching valve, by using the pressure detected by the first pressure detector in a tank non-communicated state which takes place before the first state and in which the purge passage is closed by the first switching valve and the third switching valve.

* * * * *